| United States Patent [19] | [11] Patent Number: | 5,790,527 |
|---|---|---|
| Janky et al. | [45] Date of Patent: | Aug. 4, 1998 |

[54] TRUNKED RADIO FREQUENCY COMMUNICATION SYSTEM FOR ACCOMMODATING BOTH FREQUENCY AND TIME DIVISION BASED RF COMMUNICATIONS

[75] Inventors: William O. Janky, Goode, Va.; Philip C. Gulliford, Longwood, Fla.; Clayton F. Helvey, Bedford, Va.; Satish Kappagantula, Cary; Ross W. Lampe, Raleigh, both of N.C.; Anthony B. Waldroup, Suwanee, Ga.

[73] Assignee: Research Triangle Park, N.C.

[21] Appl. No.: 359,691

[22] Filed: Dec. 20, 1994

[51] Int. Cl.⁶ .......................................... H04J 4/00
[52] U.S. Cl. .................................. 370/330; 370/321
[58] Field of Search ..................... 370/50, 69.1, 77, 370/94.1, 60.1, 61, 94.3, 95.1, 95.2, 95.3, 85.7, 6, 7, 8, 9, 10, 11, 12, 110.1, 118, 202, 205, 212, 213, 240, 251, 253, 309, 315, 314, 319, 320, 331, 326, 327, 330, 335, 336, 337, 341–345, 350, 389, 441, 480, 498, 503; 455/33.1, 33.2, 33.3, 54.1, 72, 11.1, 13.1, 13.2, 517, 553, 552, 38.1; 379/59, 60, 4; 375/205, 211, 240, 356, 355

[56] References Cited

U.S. PATENT DOCUMENTS

| 3,673,335 | 6/1972 | Joel, Jr. .............................. 370/6 |
| 4,813,035 | 3/1989 | Bishop et al. ...................... 370/50 |
| 4,817,089 | 3/1989 | Paneth et al. ...................... 370/95.1 |
| 4,852,086 | 7/1989 | Eastmond et al. ................. 370/69.1 |
| 4,912,705 | 3/1990 | Paneth et al. ...................... 370/95.1 |
| 4,914,651 | 4/1990 | Lusignan ............................ 370/69.1 |
| 5,022,024 | 6/1991 | Paneth et al. ...................... 370/50 |
| 5,038,342 | 8/1991 | Crisler et al. ...................... 370/50 |
| 5,084,869 | 1/1992 | Russell .............................. 370/85.7 |
| 5,119,397 | 6/1992 | Dahlin et al. ...................... 379/59 |
| 5,151,926 | 9/1992 | Chennakeshu et al. ............ 329/304 |
| 5,179,360 | 1/1993 | Suzuki ............................... 332/103 |
| 5,202,901 | 4/1993 | Chennakeshu et al. ............ 455/60 |
| 5,257,401 | 10/1993 | Dahlin et al. ...................... 455/33.2 |
| 5,278,837 | 1/1994 | Kelley ................................ 370/120 |
| 5,283,815 | 2/1994 | Chennakeshu et al. ............ 455/60 |
| 5,319,634 | 6/1994 | Bartholomeau et al. ........... 370/50 |
| 5,335,355 | 8/1994 | Tanaka et al. ..................... 455/33.1 |
| 5,343,513 | 8/1994 | Kay et al. .......................... 379/59 |
| 5,390,366 | 2/1995 | Kasugai ............................. 370/332 |
| 5,481,545 | 1/1996 | Maedjaja et al. .................. 370/341 |
| 5,504,939 | 4/1996 | Mayrand et al. ................... 455/54.2 |
| 5,519,691 | 5/1996 | Darie et al. ........................ 370/95.1 |

FOREIGN PATENT DOCUMENTS

| 2 077 095 | 3/1993 | Canada . |
| 90/08434 | 7/1990 | WIPO . |

*Primary Examiner*—Dang Ton
*Attorney, Agent, or Firm*—Nixon & Vanderhye P.C.

[57] ABSTRACT

In a trunked radio communications system, apparatus and methods are provided for transparently updating existing frequency division multiple access (FDMA) communications facilities to accommodate time division multiple access (TDMA) communications. TDMA channels are added to existing FDMA sites on an individual basis to increase spectral efficiency and capacity while still being compatible with existing FDMA equipment and protocols. For example, the existing FDMA control channel and protocols are used by dual mode sites and dual mode radios. A dual mode radio transceiver selectively participates in trunked radio communications in either an FDMA mode or in a TDMA mode. Each dual mode radio includes a memory for storing a mode identifier identifying each channel as an FDMA or a TDMA working channel. When a channel assignment is made, the dual mode radio determines from that channel mode identifier stored in memory whether to operate in the FDMA or TDMA mode for that particular communication. Moreover, dual mode radios expedite synchronization to a TDMA working channel (time slot) using a timing relationship established between the FDMA control channel and the TDMA working channels. In the context of multiple site, trunked radio communications, the present invention provides for interoperability between sites and radios which have TDMA communications capabilities and sites and radios which have only FDMA capabilities.

38 Claims, 14 Drawing Sheets

Fig. 4(a)
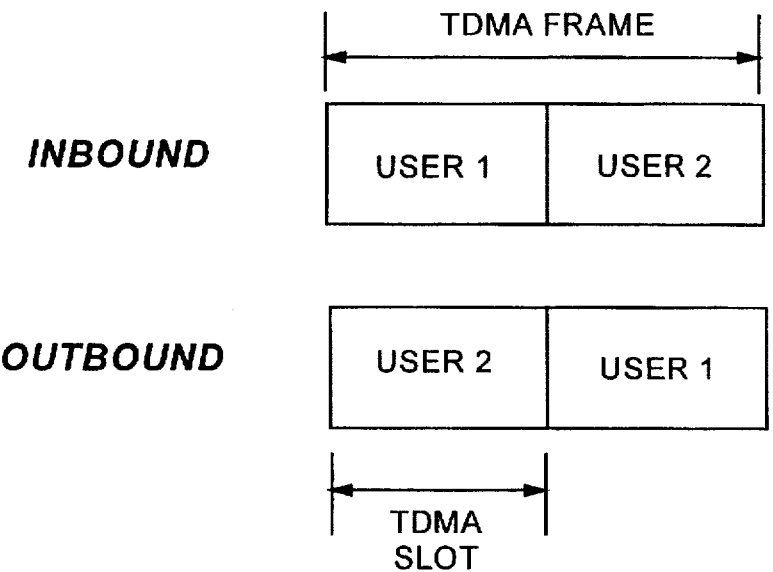
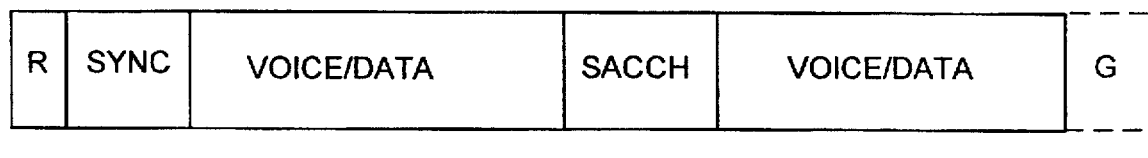
INBOUND TDMA SLOT FORMAT
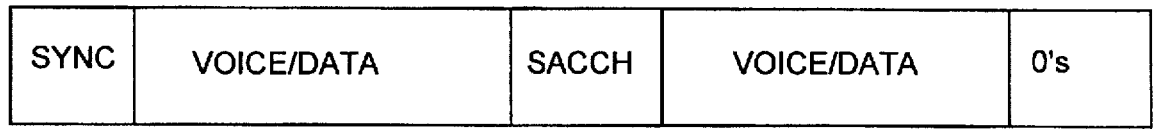
OUTBOUND TDMA SLOT FORMAT
Fig. 4(b)

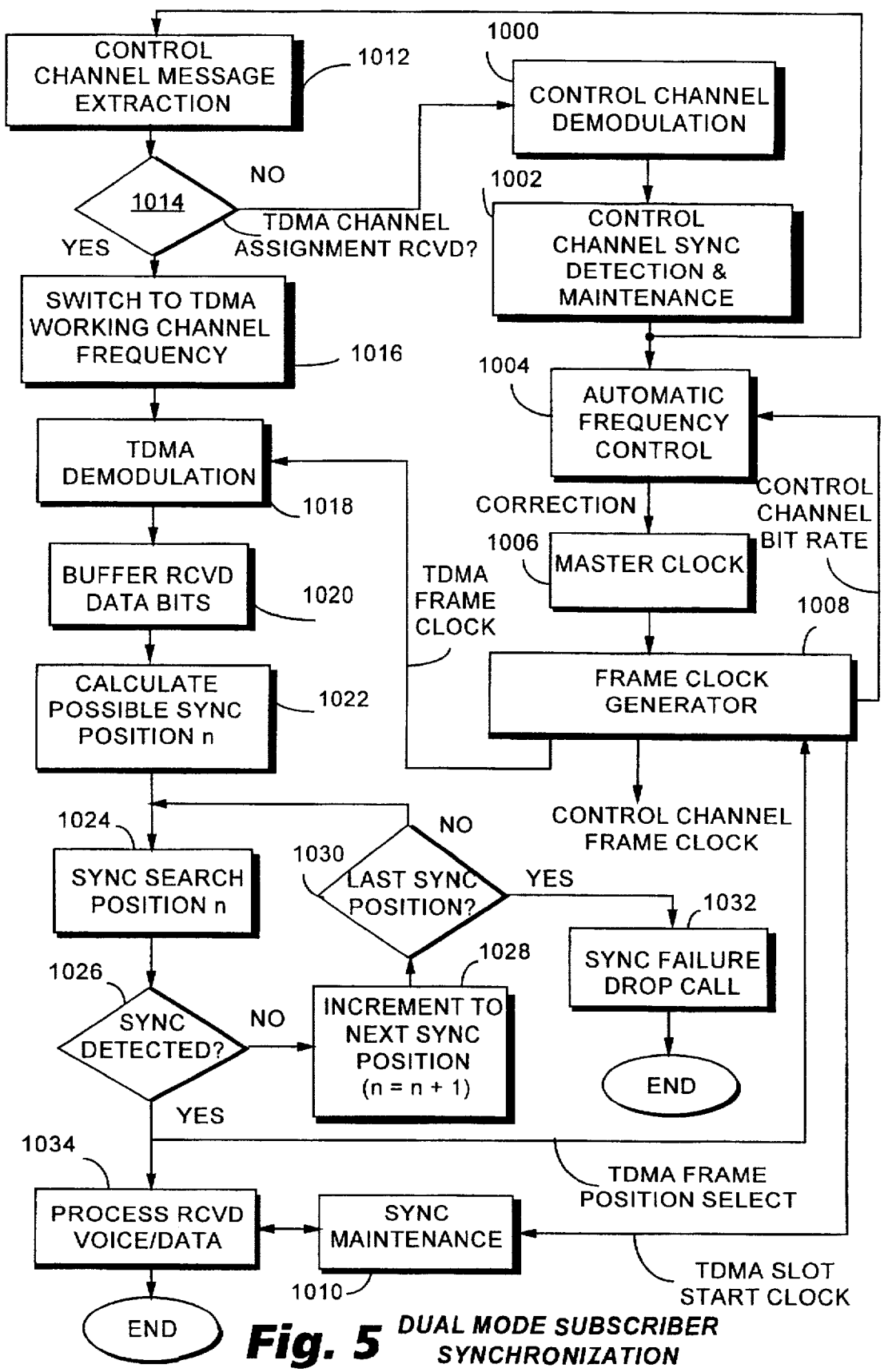
Fig. 5 DUAL MODE SUBSCRIBER SYNCHRONIZATION

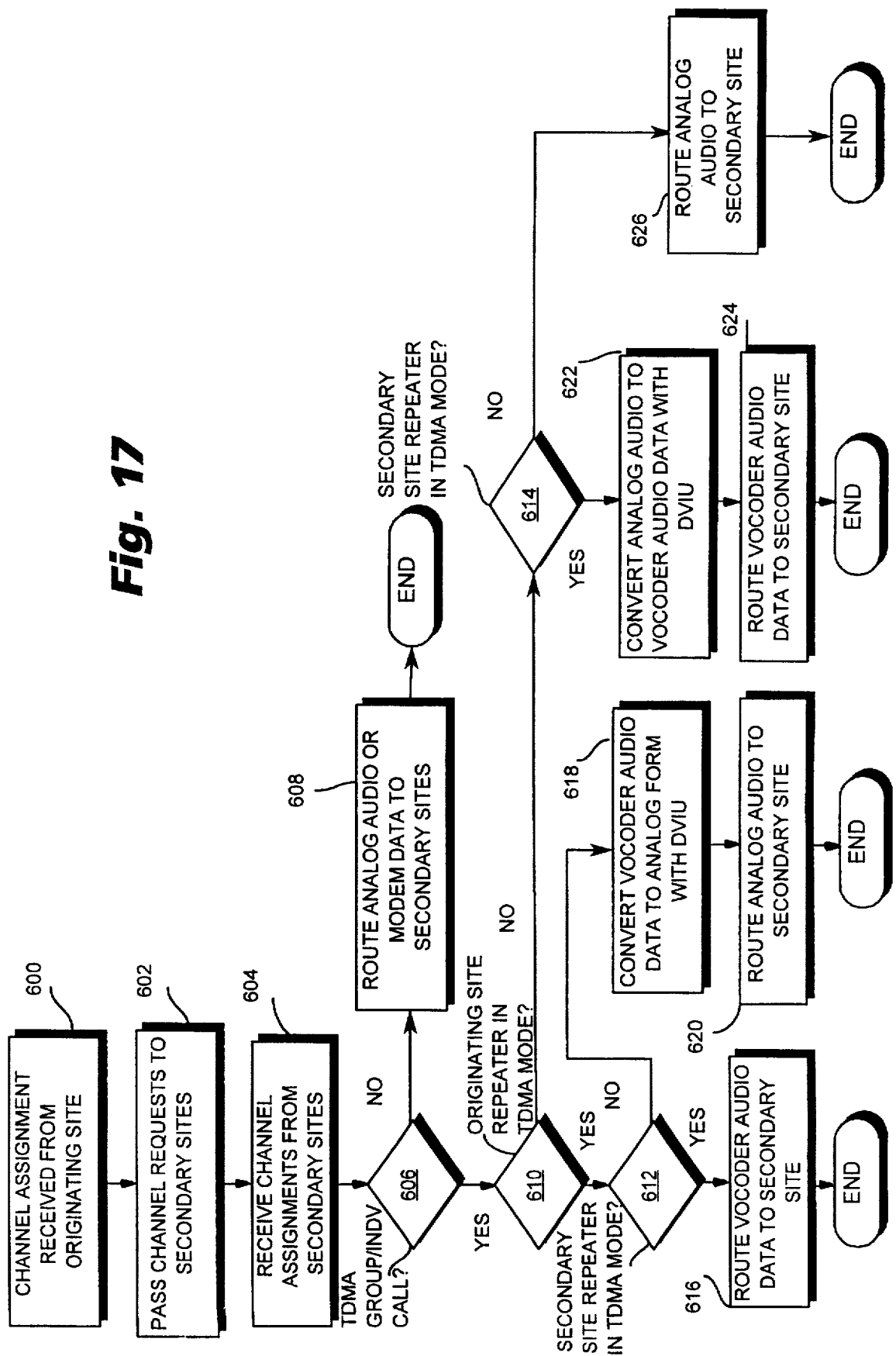

TRUNKED RADIO FREQUENCY COMMUNICATION SYSTEM FOR ACCOMMODATING BOTH FREQUENCY AND TIME DIVISION BASED RF COMMUNICATIONS

FIELD OF THE INVENTION

The present invention relates to radio frequency (RF) trunked communication systems, and more particularly, to an RF trunked communication system which accommodates both frequency and time division based RF communications.

BACKGROUND AND SUMMARY OF THE INVENTION

Current trunked radio communication systems utilize analog modulation to transmit analog audio signals over a single radio frequency. One such existing land mobile trunked radio communication system is the Enhanced Digital Access Communication System (EDACS) provided by Ericsson GE Mobile Communication Inc. In the EDACS system, radios obtain access to analog frequency modulation (FM) based working channels over which analog voice is transmitted using a common digital control channel for controlling radio access to the working channels.

As shown in FIG. 1, trunked mobile communications are carried out using analog FM base station repeaters centrally located in a fairly large geographical area referred to as a "site" on the order of 2000 square miles, e.g. corresponding to a radius of about 25-30 miles. Base station repeaters receive analog, frequency modulated signals representing the speech of the person speaking into the transmitting mobile radio unit 10A on one frequency F1 and retransmit the signal to other receiving mobile radio units 10B within the site area on another frequency F2. These two frequencies F1 and F2, known as a "frequency pair," make up an analog FM base station repeater "channel." Accordingly, each base station repeater in a site is assigned its own frequency pair or channel. For ease of description and subsequent distinction from time slot based channels described below, a radio communication where one frequency carries a single radio subscriber communication is referred to as a frequency division multiple access (FDMA) communication.

Digital information, such as digitized encrypted speech and digital data, may also be transmitted using a single analog base station repeater with the RF carrier being modulated with digital rather than analog signals. One common digital modulation technique is frequency shift keying (FSK) where the frequency of the RF carrier is slightly increased or decreased depending on whether the digital information has a high or low logic value. Access to an FDMA working channel (and therefore an FDMA base station repeater) is coordinated through a common FDMA digital control channel using frequency shift keying modulation of digital control bits and an appropriate RF protocol access technique. One RF protocol access technique used in the EDACS system is slotted ALOHA.

The advent of digital cellular systems in Europe (GSM) and in the United States (ADC) has increased awareness of and interest in digital radios. The main impetus driving digital technology in cellular systems is the desire for spectral efficiency and increased capacity, i.e. more users per RF channel. Similarly, trunked radio communications used in land mobile radio applications like police, fire, and other public safety environments also require increased capacity and more efficient use of channel bandwidth.

Significant interest has been shown in the cellular phone industry in a digital mode of operation in which time division multiple access (TDMA) techniques segment a single frequency carrier into consecutive repetitive frames of time slots with each slot in a frame so that plural voice communications occupy a single frequency. Since in the FDMA mode, a single frequency supports only one user at a time, TDMA achieves a significant increase in capacity by supporting multiple users on a single frequency. For ease of description and distinction from FDMA communications, such digital, time slotted type communications are referred to as TDMA communications.

Despite the advantages of TDMA communications, huge investments in existing FDMA systems make it economically impractical to immediately replace the existing FDMA systems with TDMA systems. The problem then is one of integrating digital TDMA technology into existing FDMA based land mobile radio systems. Optimally, the new technology would be integrated in a transparent fashion to minimize impact on existing users but would nonetheless provide the advantages of the new technology, e.g. increased capacity per unit bandwidth. It would be even better if the new technology could be integrated incrementally such as by adding one TDMA base station/channel at a time. Furthermore, the newly added TDMA equipment should be "backwards compatible" with existing FDMA equipment so that TDMA radios can operate on FDMA channels.

The present invention provides methods and apparatus which transparently integrate TDMA capabilities to existing trunked, FDMA-based, communications systems to achieve the benefits of TDMA technology while minimizing the impact on existing FDMA land mobile radio communication infrastructures.

A trunked radio repeater communication system includes a control channel repeater and plural working channel repeaters. One of the working channel repeaters is a conventional frequency division multiple access (FDMA) repeater transmitting on an RF frequency. Another of the working channel repeaters is a dual mode repeater that selectively operates in one mode as a time division multiple access (TDMA) working channel corresponding to one of plural time slots time division multiplexed onto a single RF frequency or in another mode as a FDMA repeater corresponding to an RF frequency. The dual mode repeater includes a dual mode transceiver for participating in trunked radio communications over the FDMA working channel in the FDMA mode and for participating in trunked radio communications over the TDMA working channel in the TDMA mode. When the dual mode repeater receives a working channel assignment and determines the mode of operation for the assigned working channel, the dual mode transceiver is operated in the appropriate FDMA or TDMA mode.

A dual mode radio for use in a trunked radio repeater communications system includes a dual mode transceiver for participating in trunked radio communications over the FDMA working channel in an FDMA mode and for participating in trunked radio communications over a TDMA working channel in a TDMA mode. The dual mode radio includes a memory for storing an identification of each potential working channel as an FDMA working channel or a TDMA working channel. A request for a channel is made using the same control channel, (in one embodiment an FDMA control channel), irrespective of the type of working channel that is ultimately assigned. When the dual mode radio receives a working channel assignment over the control channel, it determines the assigned working channel identification, and from that channel identification, determines the mode corresponding to that channel in the memory and operates the dual mode transceiver accordingly.

Such dual mode radios quickly and reliably establish synchronization with an assigned TDMA working channel corresponding to a particular time slot on a radio frequency by establishing a relationship between a time when FDMA control channel frames are generated and a time when TDMA working channel time slots are generated in the RF working channel. Each control channel frame includes frame synchronization bits, and each time slot includes slot synchronization bits. The established relationship may be, for example, a consistent periodic alignment of the control channel frame synchronization bits and the time slot synchronization bits. By using the control channel frame synchronization bits as a reference, the dual mode transceiver determines the most likely point in a received, working channel bit stream where the time slot synchronization bits will align with the frame synchronization bits.

A site controller stores for each radio a radio identification number and a corresponding mode indicator indicating whether the radio can communicate on a slotted working channel or is limited to communications using a single frequency working channel. When the site controller receives requests for working channels over a control channel from a particular radio, the site controller assigns either a slotted or a single frequency working channel by detecting the radio identification of the requesting radio and looking up in memory the stored corresponding mode indicator. Radio talk groups are also assigned identification numbers with corresponding mode indicators. As a result, the mode of group calls is set up as it is for individual radio-to-radio calls using the identification number of the group.

The present invention advantageously adapts an existing FDMA trunked radio communication system, which includes a plurality of base station repeaters with one repeater being a control channel repeater through which radios request access to a working channel and plural FDMA base station repeaters that provide FDMA working channels, to incorporate one or more TDMA working channels by adding one or more TDMA base station repeaters. Thereafter, each trunked radio communication request is analyzed to determine whether or not it is to be carried out on an FDMA or a TDMA working channel so that the trunked radio communication is assigned to an FDMA base station repeater for an FDMA call or to a TDMA base station repeater for a TDMA call.

The channel numbering scheme of an existing FDMA trunked radio communications system may also be modified to add TDMA working channels without having to rework the existing channel numbering plan. The first set of channel numbers already assigned to single frequency FDMA communication channels in the existing trunked radio communication system is maintained. A second, additional set of channel numbers is assigned as dual mode working channels that can function either as an FDMA working channel or a TDMA working channel depending on a selected mode of communication.

The present invention also extends to multiple site trunked radio communications systems and provides interoperability between single mode FDMA sites and dual mode sites servicing single mode FDMA radios and dual mode radios. A multisite switch connected to each sites routes information between those sites to permit trunked communications between radios located in different sites geographical areas. For example, a radio operating in an FDMA mode located in a geographical area corresponding to one site communicates via the multisite switch with a radio or group of radios operating in a TDMA mode located in a geographical area corresponding to another site.

Specifically, a conversion interface module is connected to the switch and converts communications in an analog format used in FDMA communications into a digital encoded format used in TDMA communications and converts communications in the digital encoded format into the analog format. For example, the conversion interface module permits an FDMA transceiver to participate in multisite, digital encoded communications with one or more TDMA radio transceivers. Digital vocoded TDMA communications that involve an FDMA radio transceiver on another site are routed through the switch to the conversion interface module where the vocoded communications are decoded and transmitted from the multisite switch in analog form to the FDMA radio via its corresponding site. Thus, the present invention permits TDMA⇌TDMA, FDMA⇌FDMA, and FDMA⇌TDMA trunked radio communications in a multisite environment.

BRIEF DESCRIPTION OF THE DRAWINGS

These and other features and advantages of the invention will be readily apparent to one of ordinary skill in the art from the following written description, read in conjunction with the drawings, in which:

FIGS. 4(a) and 4(b) show a TDMA frame and time slot format, respectively, for inbound and outbound TDMA working channel time slots;

FIG. 5 is a flow chart diagram illustrating TDMA radio synchronization procedures in accordance with the present invention;

FIG. 17 is a flowchart diagram illustrating how multisite calls involving FDMA and TDMA radios, groups, and base stations are processed.

DETAILED DESCRIPTION OF THE DRAWINGS

In the following description, for purposes of explanation and not limitation, specific details are set forth, such as particular block diagrams, interfaces, techniques, etc. in order to provide a thorough understanding of the present invention. However, it will be apparent to one skilled in the art that the present invention may be practiced in other embodiments that depart from these specific details. In other instances, detailed descriptions of well known methods, devices, circuits, etc. are omitted so as not to obscure the description of the present invention with unnecessary detail.

Figure 1:
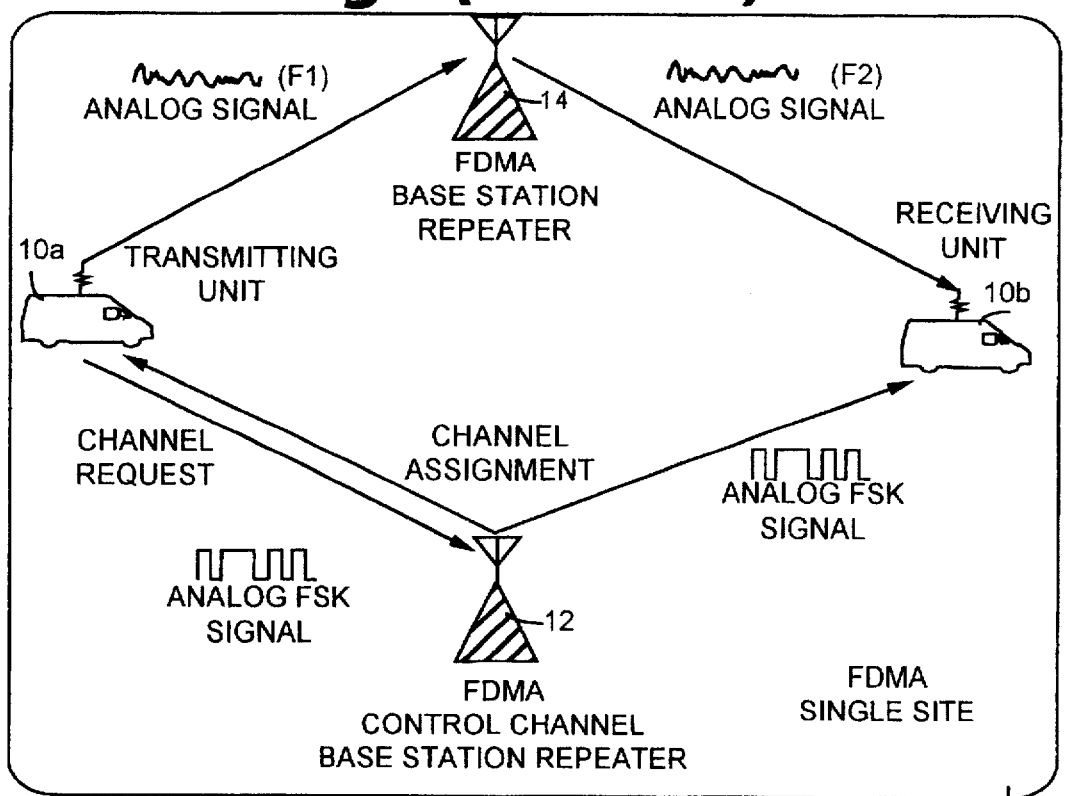
FIG. 1 is a high level diagram of a single site, trunked RF communication system.
Figure 2:
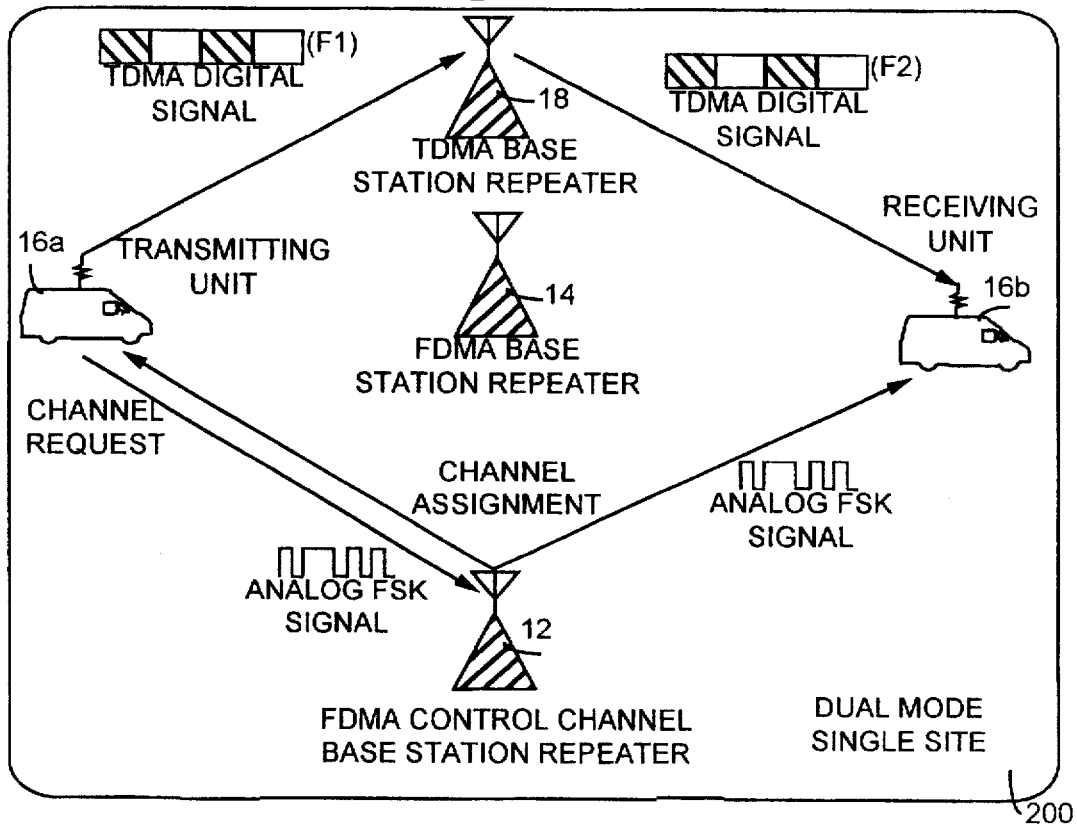
FIG. 2 is a high level diagram of a dual mode, single site trunked communications system which accommodates FDMA and TDMA communications in accordance with the present invention.

FIG. 2 is a high level diagram showing a single "dual mode" trunked RF communications site that accommodates frequency channel (FDMA) and time slot channel (TDMA) communications. Dual mode mobile radio unit 16A operates in either an FDMA or a TDMA communications mode and requests a TDMA working channel using the FDMA control channel via FDMA control channel repeater 12. FDMA control channel repeater 12 assigns either an FDMA base station repeater 14 or a TDMA base station repeater 18 based on the nature of the call request. FDMA calls are transmitted over the air in traditional fashion, e.g., for analog voice—frequency modulated, and for digitized voice/digital data—frequency shift keyed onto a carrier frequency. TDMA calls are in all digital format and are transmitted during one of plural time slots using a spectrally efficient digital modulation technique such as π/4-differential quadrature phase shift keying (π/4-DQPSK) or continuous phase modulation (CPM). Dual mode radio units therefore communicate with existing FDMA radio units and groups of radios using existing FDMA base station repeaters and with TDMA radios and groups using TDMA base station repeaters.

In a typical communication scenario, when a dual-mode radio makes a call request, that request indicates the radio and/or group identification numbers (IDs) involved in the call. As is well known in trunked communications, a radio user selects a group on his radio by turning the knob or pushing a button which causes that radio's ID to be logged into a database maintained at the site controller and an overall systems manager via an RF control channel message for this particular talk group. This tells the communications system that a radio belonging to this group is located in a particular site, and therefore, if a multisite call (described in more detail below) originates in another site, the system knows to bring up a channel at this particular site to include this particular radio user in the group call.

More specifically, when the initiating radio's push-to-talk (PTT) button is activated, a communication request for a working channel including the appropriate originating individual radio ID and radio group ID (or destination radio ID for radio to radio calls) are transmitted over the existing FDMA control channel to a dual mode site controller which controls both FDMA and TDMA base station repeaters. A database of individual radio and group identification numbers (IDs) is maintained at the site controller and system manager. The site controller uses that database to determine which type of base station repeater to assign to the call by accessing the capabilities of the source and destination radios and/or radio groups to be involved in the call which are also stored in the database for each radio and group. If a TDMA group is requested or an individual radio to radio call is requested between two dual mode radio units, then a channel assignment may be made by the dual mode site controller to an available TDMA frequency and slot associated with an available digital TDMA base station repeater which corresponds to a TDMA working channel.

The Dual Mode Principle: FDMA and TDMA Working Channels

A basic principle of dual mode telecommunications in the present invention is the selective use of FDMA working channels and TDMA working channels based on working channel availability and the capabilities of those radios involved in a call. An FDMA working channel is a single frequency for accommodating analog FM voice or digital FSK digitized voice and data. A TDMA working channel is a sequence of packets of digitized voice or digital data communicated on a single frequency over one of a plurality of time divided slots with each time slot corresponding to a communications channel. Dual mode, as used in the context of the present invention is the capability of a radio transceiver (either a portable transceiver such as a mobile or portable radio or a stationary transceiver such as a base station repeater) to transmit and receive both voice and "data" (such as facsimile data) over either an FDMA or a TDMA working channel. Dual mode radios can be used with the existing FDMA site/repeater infrastructure, with new TDMA base station repeaters added to existing FDMA repeaters to increase capacity and spectral efficiency, and of course with new, all TDMA sites which have the greatest capacity/efficiency.

Figure 3:
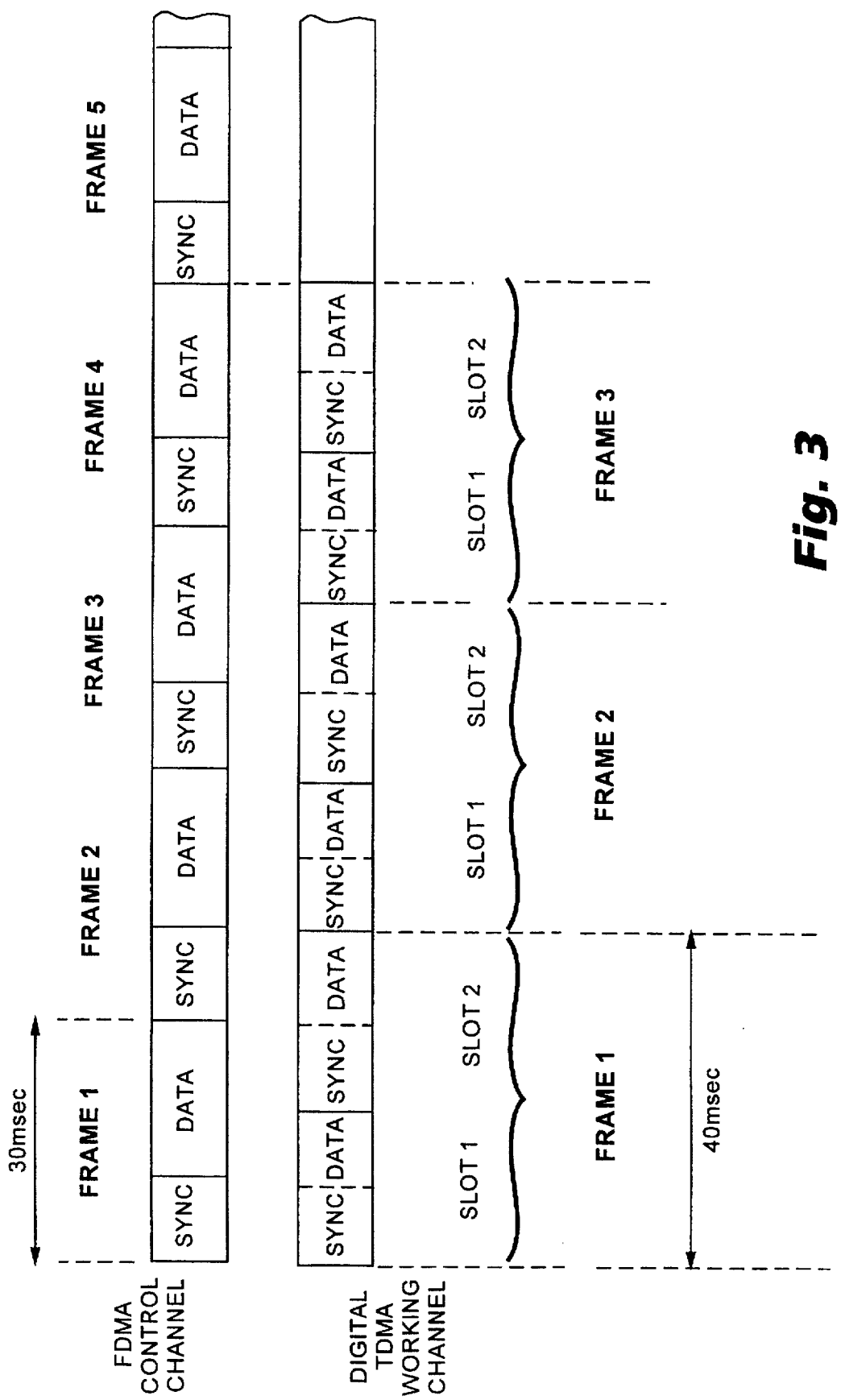
FIG. 3 shows a frame and slot structure for plural TDMA working channels over a single frequency and a relationship between a FDMA control channel sync fields and sync fields in TDMA working channel time slots.

FIG. 3 illustrates the format of the TDMA working channel slot format and the FDMA digitized control channel that is used to coordinate working channel requests, grants, and drops. The FDMA control channel is divided into a plurality of consecutive frames with each frame being for example thirty milliseconds in length. Each frame includes synchronization bits and a data field. The synchronization bits include for example dotting bits and Barker codes to permit radios tuned to the FDMA control channel to obtain synchronization. The data fields include control message bits for coordinating trunked radios communications and may be formatted as described in U.S. Pat. No. 4,905,302 incorporated hereby by reference. Although not shown here, there are both outbound and inbound (relative to the base station) FDMA control channel frequencies for radios to transmit/receive digital control information via the FDMA control channel to/from the FDMA control channel base station repeater. FIG. 3 shows the outbound control channel.

Also shown in FIG. 3 is a digital TDMA working channel comprised of a sequence of time slots, each time slot containing synchronization and data fields. In the working channel, the "data" bits include the actual content of the message/call including digitized speech and raw data from a facsimile, personal computer, etc. In the instant embodiment, two time slots are shown interleaved on a single frequency in 40 millisecond frames. Each time slot is repeated, therefore, every 40 milliseconds. Additional time slots, e.g. three, four, etc. could be included per frame to provide additional TDMA channels on one frequency thereby further increasing capacity and spectral efficiency.

FIG. 3 illustrates a preferred synchronized relationship between the thirty millisecond TDMA control channel frame and the forty millisecond digital TDMA working channel frame comprising time slots 1 and 2. The frames are aligned so that the start of the synchronization bits of the FDMA control channel frame regularly and periodically align with the start of the synchronization bits of the digital TDMA working channel. For example, in FIG. 3, the sync bits of every fourth frame of the control channel align with the sync bits of every third frame of the working channel. This synchronized relationship is used advantageously in the present invention to permit dual mode radios to quickly obtain synchronization to an assigned TDMA digital working channel, i.e. frequency and time slot, using the alignment of sync fields between the FDMA frame and a TDMA time slot as described in further detail below in conjunction with FIG. 5.

FIGS. 4(a) and 4(b) illustrate example inbound and outbound TDMA time slot formats. Like the FDMA control channel, each TDMA working channel corresponds to a transmit and receive pair of time slots on respective offset transmit and receive carrier frequencies. Typically, the carriers are in the 800 to 900 MHz range with the center frequencies of each pair offset by 45 MHz, and each working channel occupies approximately 12.5 or 25 KHz of bandwidth. In addition to the outbound and inbound transmit and receive frequencies being offset (in frequency), the receive and transmit time slots are offset (in time) by one time slot to prevent overlap of the time slots as shown in FIG. 4(a). TDMA base station repeaters in a dual mode site a dual mode radplural time slots. Once a dual mode radio obtains synchronization with the outbound TDMA working channel using the synchronization bits of the FDMA control channel, the radio automatically calculates the appropriate transmit time for its assigned inbound working channel time slot based on the time slot offset.

Within each TDMA time slot, bits are allocated to certain functions. Bits in the ramp time field (R) allow the mobile/portable radio to power up its RF circuitry. Ramp bits are not necessary on an outbound channel because the TDMA base station transmits continuously on all time slots, i.e. the RF circuitry is usually not powered down. The sync bits (SYNC) are binary patterns of bits (or words) used for synchronization and time slot identification. The SYNC words are chosen to maximize autocorrelation properties and to minimize cross correlation properties with SYNC words of different time slots. The voice/data field contains either voice or data bits pertaining to the actual content of the communication. Forward error correction (FEC) overhead bits are preferably added to protect the voice/data. The digitized voice/data can be encrypted or unencrypted (clear). The slow associated control channel (SACCH) field includes control information sent simultaneously with the voice/data. SACCH data preferably replace sub-audible data used in existing FDMA land mobile radio (LMR) systems such as the EDACS system described above and provide various LMR functions such as priority scan.

Guard time (G) relates to the fact that the inbound time slots are synchronized and transmitted with an offset from their associated outbound time slots. Because radios are usually at varying distances from a TDMA base station, there are varying delays between the times at which each time slot in a TDMA working channel frame will arrive at the TDMA base station repeater. Unfortunately, the different delays result in overlap of the inbound time slots. The number of guard time bits is set to compensate for the maximum amount of overlap that could occur with units operating up to certain distance from the site. In other words, the overlapping bits are not used to communicate substantive information but simply to allow for time slot overlap that would interfere with the substantive slot bits conveying part of the call message.

In high speed data applications, such as facsimile transmissions, multiple time slots may be assigned to a single user. For example, a user places a call request using a reserved ID stored in the site database that identifies the call based as a multiple time slot request. In this mode of operation, the time slot format is adaptively changed to a "super" time slot format by removing some of the redundant fields. Alternatively, low speed text messages may be transmitted as part of the SACCH signalling. Either or both provide an enhanced ability to increase data throughput.

A particularly advantageous radio synchronization technique which can be used by a dual mode radio to quickly obtain synchronization with a TDMA working channel in accordance with one aspect of the present invention will now be described in conjunction with the flow chart illustrated in FIG. 5. All radios, including dual mode radios, monitor the FDMA control channel frequency for control channel messages, e.g., channel assignment messages. Thus, before any working channel synchronization can take place, the radio must first demodulate the control channel (block 1000) and detect (and maintain) control channel synchronization using known techniques such as those employed in the EDACS system described above (block 1002). Control then branches off into two loops.

One loop begins at block 1004 where automatic frequency control functions are performed. In theory, the demodulated control channel information should be received at a particular bit rate such as 9600 bits per second. The automatic frequency control function in block 1004 receives a feedback control channel bit rate, which although it should ideally be at the same bit rate as the demodulated control channel information, i.e. 9600 bits per second in this example, it often times is not. Any difference in bits per second is determined by the automatic frequency control function with a correction value being applied to the master clock 1006 frequency. This frequency feedback correction is similar to a phase lock loop. A frame clock generator 1008 then divides down the master clock frequency to generate a frame and time slot clocking signals. For example, a TDMA working channel frame clock signal is generated in the preferred embodiment 40 milliseconds while an FDMA control channel frame clock is generated once every 30 milliseconds. In addition, a TDMA working channel time slot clock may be generated once every twenty milliseconds.

The other control branch from sync detection and maintenance block 1002 proceeds to control channel message extraction block 1012. Once the control channel message is extracted, the radio determines from identification bits in the demodulated control channel message whether or not that message, e.g., a TDMA channel assignment, is directed for a dual mode radio in decision block 1014. If not, the radio continues to monitor the control channel in block 1000. However, if the channel assignment message is for this radio, the radio tunes to the assigned TDMA working channel frequency in block 1016 and begins to demodulate bits received on the TDMA working channel in block 1018. At this point, the radio does not yet have synchronization with the TDMA working channel.

Based on the TDMA frame clock signals provided by the frame clock generator 1008, the radio buffers an entire 40 millisecond frame of TDMA bits in block 1020 and starts an initial search for synchronization. There are a limited number "n" possible synchronization positions in a stream of TDMA bits based on the periodic alignment between synchronization fields of the FDMA control channel and TDMA working channel. The number "n" is calculated in block 1022 from that synchronization alignment relationship. The first possible sync position is examined and (block 1024), and if sync is detected (block 1026), this synchronization position is used for the duration of the call to process received voice and data information in block 1034. The detected sync information is used to align the TDMA frame clock to the properly located synchronization position and to maintain TDMA slot synchronization in block 1010. If sync is not detected at this position, the position is incremented in block 1028, and a decision is made in block 1030 where the last sync position has been detected. If it has, the radio has failed to achieve synchronization, and the call is dropped in block 1032. Otherwise, control returns to block 1022 to search for the next synchronization position and continue the sync detection process. In this way, the present invention reduces the time and effort required to achieve synchronization with a TDMA working channel time slot by utilizing the periodic, predictable alignment between FDMA control channel frames and TDMA working channel frames in order to quickly and efficiently achieve TDMA time slot (channel) synchronization.

Another aspect of the present invention permits this advantageous synchronization acquisition technique to be even further improved by embedding a bit field in the FDMA control channel to indicate the exact alignment location between the FDMA control channel and the TDMA working channel. In the example above where the fourth TDMA working channel frame aligns with the third FDMA control channel frame, a two bit sync positioning field may be included in the outbound frame of the control channel which is modulo-4 counted (i.e. 00, 01, 10, and 11) and monitored continuously by the radio to indicate the number of control channel frames until the fourth aligned frame will occur after receipt of the TDMA working channel assignment. Obviously, the count would be different for a different number control channel/working channel alignment relationship. This precise synchronization procedure makes sync acquisition more efficient and more reliable by reducing the chance of the radio obtaining false synchronization at the wrong location. Of course, other numbers of bits could be included in such a field where the periodic alignment of the control and working channels occur at different numbers of frames.

Speech Coding

In a dual mode radio system, various methods may be used to transmit speech information. In an FDMA mode, unencrypted speech information is transmitted and received as a continuous analog signal. In a digital mode, the analog speech signal is converted into a digital bit stream using for example pulse code modulation (PCM) techniques well known in the telecommunications art. Speech is low pass filtered below four KHz (to reduce the signal bandwidth) and sampled at an eight KHz rate (i.e., at twice the sampled signal's highest frequency component to satisfy the Nyquist sampling theorem). Twelve bits of information are typically considered sufficient to cover the dynamic range of speech signals, and these twelve bits of dynamic range may be reduced to eight bits using logarithmic conversion techniques such as μlaw PCM used in conventional landline telephone networks. If this logarithmic conversion is performed at an eight KHz sampling rate, a 64 kbps bit stream is generated.

Further improvements in the transmission of voice and speech information may be achieved using voice coders (vocoders). Vocoders reduce the bit stream rate by purposefully not sending all the speech information sampled in the time domain waveform but instead sending only information modelling the vocal track that generates speech. A linear predictive coder (LPC) analyzes a speech waveform to produce a time varying model of the vocal track's excitation and transfer function. Digital filter coefficients represent "the filtering" of the sound going through the human vocal track. The digital filter is driven by an excitation that represents the vibrations of the vocal cords. These filter coefficients and excitation are derived for a time slot of speech on the order or 20 to 40 milliseconds and sent as a slot of bits. A voice decoder is of course required at the receiver to decode the coded speech using the reverse transfer function. Voice coding and decoding are typically both performed using a single vocoder. Any of a number of different vocoders implementing the LPC transfer function filter but which have a different form of excitation may be used including improved multiband excitation (IMBE), code book excited LPC (CELP), vector excited LPC (VSELP), enhanced CELP, transformed binary regular pulse excitation (TRPE) and others.

Dual Mode Radio

Figure 6:
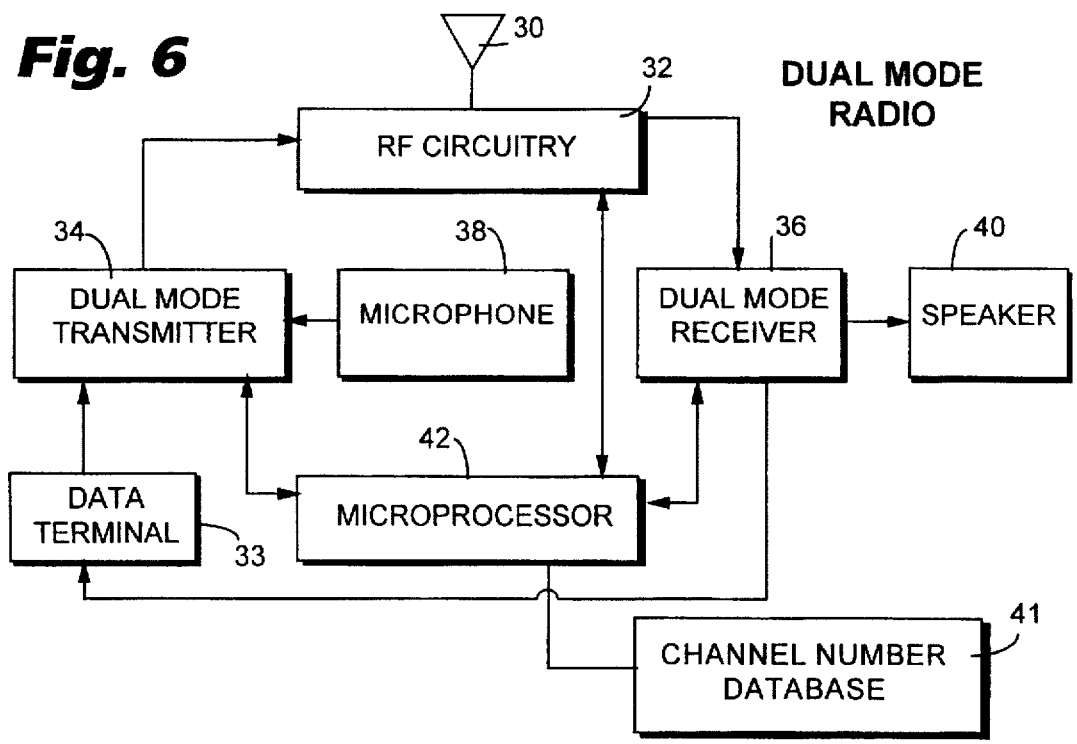
FIG. 6 is a function block diagram of a dual mode radio transceiver.

A description is now provided of a dual mode radio that may be used in accordance with the present invention. FIG. 6 is a high level function block diagram of a dual mode radio. Analog speech information from microphone 38 as well as digital data from data terminal 33 are received by a dual mode transmitter 34. The dual mode transmitter 34 processes and converts the speech/data information for transmission into the appropriate TDMA or FDMA format selected by the microprocessor 42 depending upon whether a TDMA or FDMA channel is accessed. RF circuitry 32 modulates and amplifies the speech/data information and transmits the modulated information via antenna 30. The antenna 30 also receives RF signals with RF circuitry 32 demodulating the received signals to an intermediate frequency (IF) for audio processing in dual mode receiver 36. Under the control of microprocessor 42, dual mode receiver 36 converts the information into a baseband analog audio signal for driving speaker 40 or a digital data stream to be sent to data terminal 33. A channel number database 41 is maintained by the radio which indicates those working channel numbers which are FDMA channels and those which are TDMA. Thus, when a radio receives a channel number assignment on the control channel, the radio knows immediately from database 41 whether to operate in an FDMA or a TDMA mode.

Figure 7:
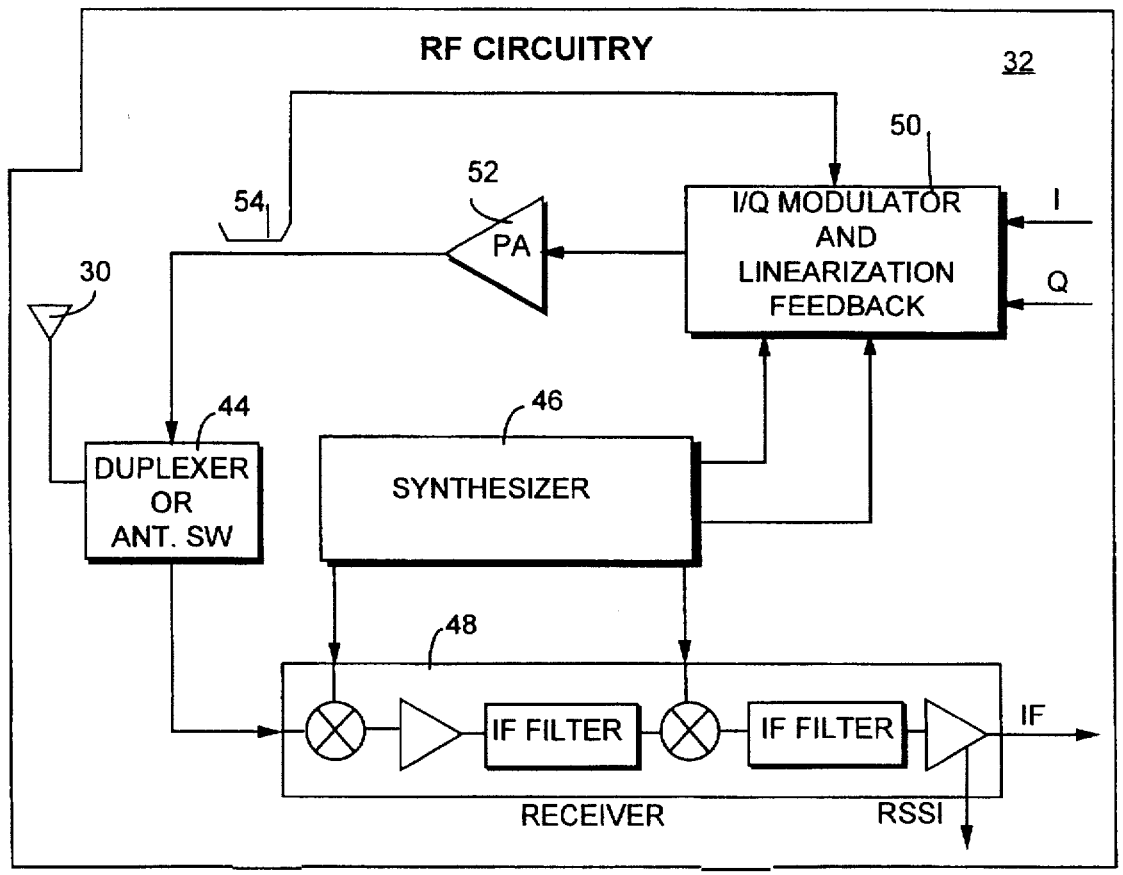
FIG. 7 is a function block diagram of RF circuitry that may be used in the dual mode radio and in TDMA base stations.

A more detailed description of various circuitry shown in FIG. 6 is now provided in conjunction with FIGS. 7–10. FIG. 7 illustrates an example of the RF circuitry 32 which may be used in accordance with the present embodiment for both FDMA and TDMA calls. Antenna 30 is attached to a duplexer or antenna switch to permit use of the same antenna for transmission and reception. Although various analog and digital modulation techniques may be used in accordance with the present invention, $\pi/4$-differential quadrature phase shift keying ($\pi/4$-DQPSK) and quaternary continuous phase-frequency shift keying modulation (quaternary CPM-FSK) techniques are preferable for use in TDMA mobile radio communications. As described above, in the conventional FDMA mode, the analog speech frequency modulates the carrier. Since $\pi/4$-DQPSK requires a linear or quasilinear power amplifier and quaternary CPM-FSK does not, higher efficiency power amplifiers may be employed with the latter modulation type. In a preferred embodiment, CPM is used for radio to base station communications, and $\pi/4$-DQPSK modulation is used for base station to radio communications.

I/Q modulator 50 receives an RF carrier mixer input from synthesizer 46 for mixing with real (I) and imaginary (Q) information signals received from the dual mode transmitter 34. Differential coupler 54 detects the RF power amplifier 52 output level which is fed back to the I/Q modulator 50 to adjust and linearize the transmit power level of the RF power amplifier 52. One example feedback linearization technique that may be used in the preferred embodiment is Cartesian feedback linearization. The modulated and amplified output from the power amplifier is transmitted via duplexer (or antenna switch) 44 and antenna 30.

Received signals are routed via antenna 30 and duplexer 44 to an intermediate frequency (IF) receiver section 48 that receives the appropriate carrier frequency inputs from synthesizer 46. IF receiver 48 inputs, mixes, amplifies, and filters the received RF signal to remove the carrier and provide an intermediate frequency signal along with an indication of received signal strength (RSSI).

Figure 8:
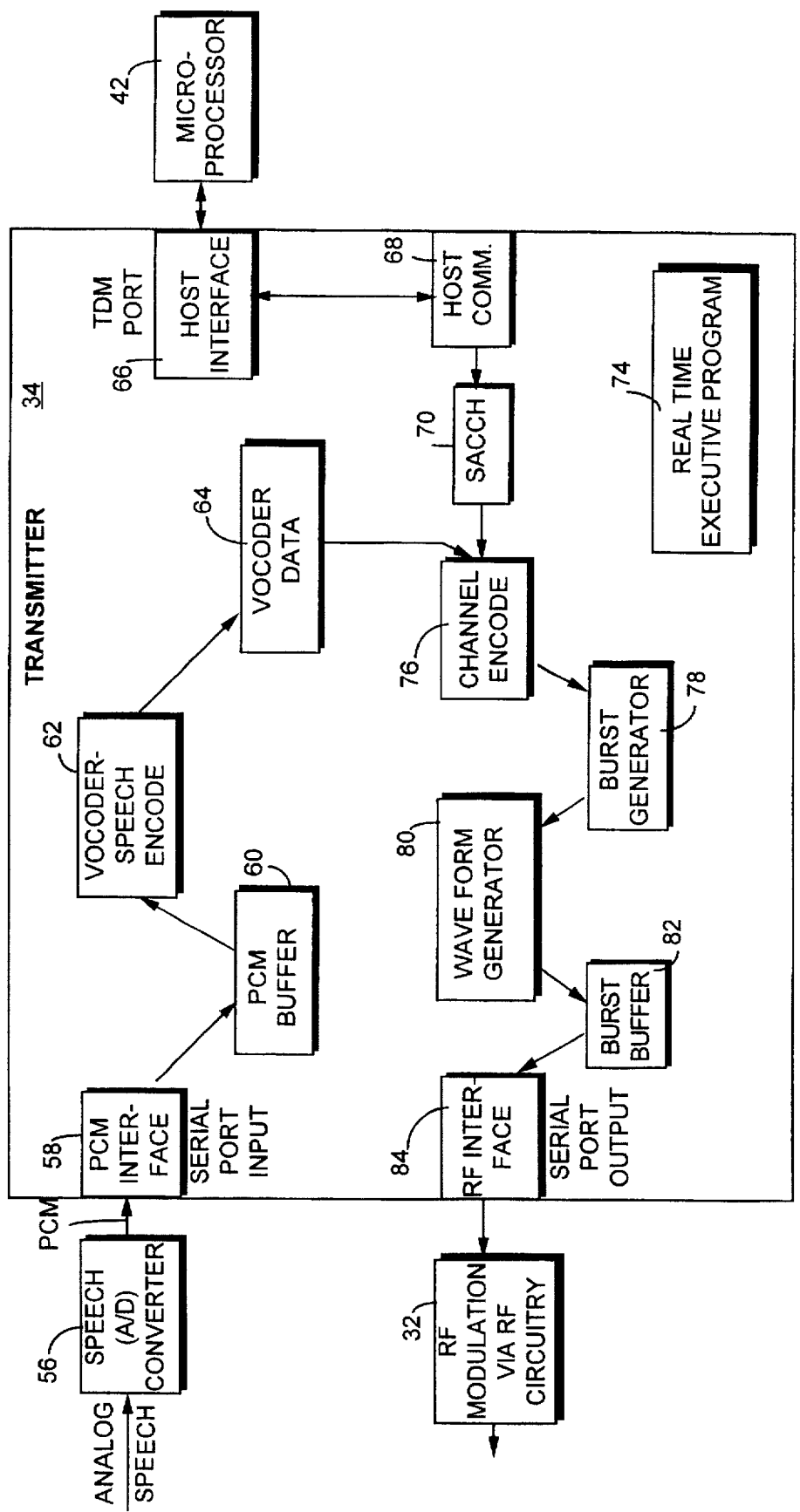
FIGS. 8 and 9 are function block diagrams illustrating digital signal processor implementations of a dual mode transmitter and receiver for the dual mode radio shown in FIG. 5.

FIG. 8 provides a function block diagram of a dual mode transmitter 34. The functions of dual mode transmitter 34 may be preferably performed using one or more digital signal processors (DSPs) either alone or in conjunction with application specific integrated circuitry (ASIC). Accordingly, many of the functions indicated by blocks in dual mode transmitter 34 may be performed by a suitably programmed DSP rather than by a separate hardware element (either analog or digital). Of course, alternative embodiments which employ discrete logic circuits, analog components, and/or programmed microprocessor/ microcomputers may also be used to implement the claimed invention.

Analog speech is received at an analog to digital converter 56 which converts the analog speech into a PCM digital stream received at a serial input port and stored in PCM interface 58. Frames of PCM data are stored in PCM buffer 60. The buffer output is vocoded, i.e. encoded, by vocoder 62 using one of the linear predictive coding techniques described above, preferably improved multiband excitation. A channel encoder 76 adds forward error correction (FEC) bits to the vocoder bit stream output 64 and then interleaves that bit stream in particular time slots over multiple frames (for fading protection) along with corresponding control information such as the SACCH control information 70 (described above in FIG. 4) which is generated by microprocessor 42 and provided via host interface 66 and host communication buffer 68. Burst generator 78 collects the channel encoded output into a "burst" format, i.e. a time slot. Although a burst and a time slot refer to the same thing, since in the TDMA mode two or more radios share the same frequency on the uplink channel to the base station on separate time slots, it is common to refer to radios as bursting their transmission since it is discontinuous in contrast with continuous FDMA radio transmissions. On the downlink from the base station to the radios, the base station continuously generates information on all time slots so that its transmissions are continuous. Therefore, the term burst is not applicable to downlink channels. Waveform generator 80 takes the final bit stream including the vocoded speech bits, the forward error correction bits, the control bits such as the SACCH bits, etc. and filters that bit stream for various regulatory specifications, e.g., the FCC 12.5 KHz channel spacing bandwidth, etc., and then divides the bit stream into real (I) and imaginary (Q) bit streams. The burst buffer 82 stores the I and Q outputs from waveform generator 80 and passes parallel bursts of I/Q data to the RF interface 84 for serial output to the RF circuitry 32 for RF modulation. All the transmitter 34 DSP functions are coordinated under the control of a real time executive program 74.

Figure 9:
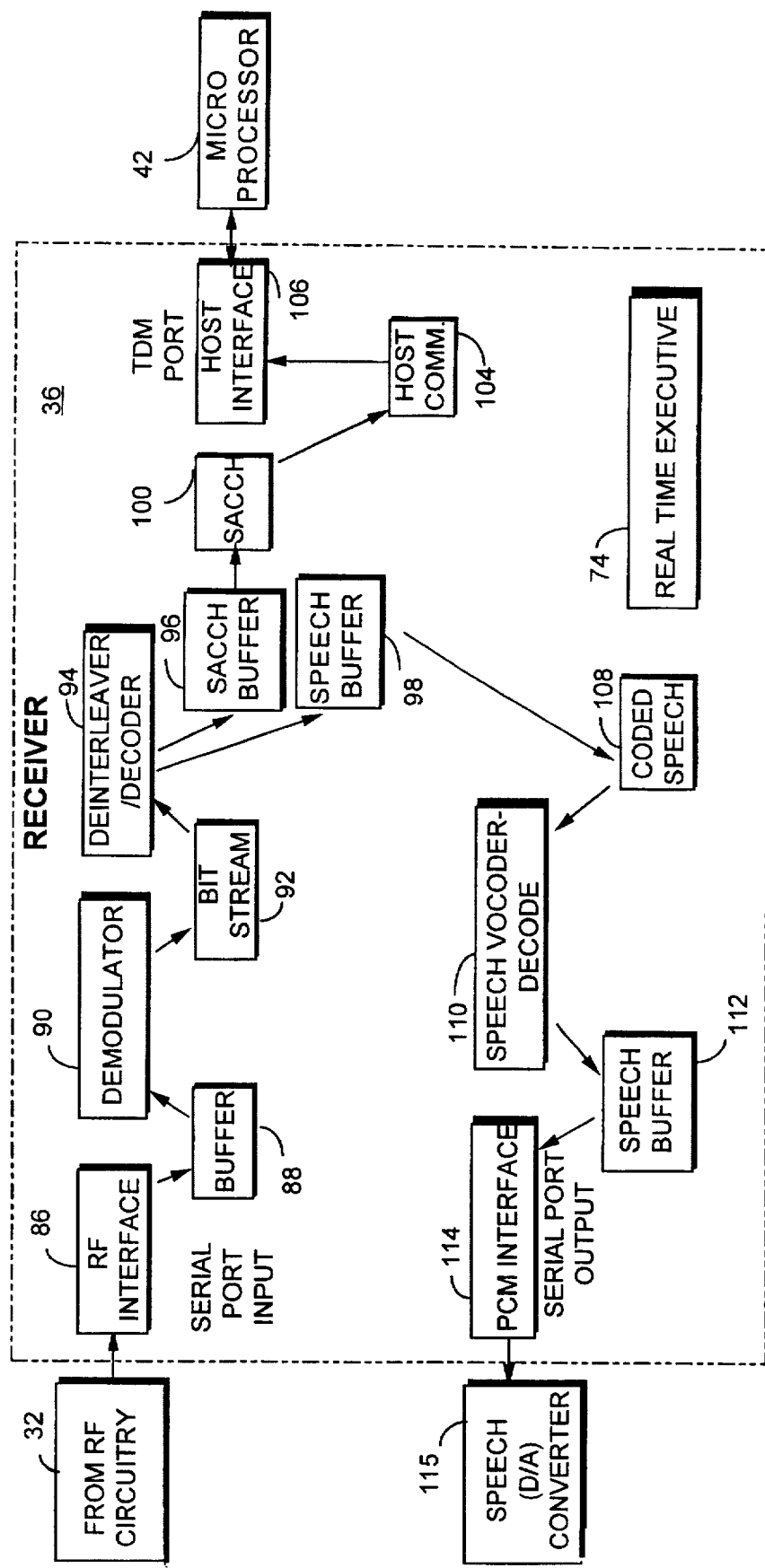

FIG. 9 illustrates in a format similar to that of FIG. 8 the functions performed by receiver 36 using one or more DSPs. RF signals from RF circuitry 32 are received via serial input port at RF interface 86. The interface bits are stored in a buffer 88 and then demodulated in accordance with an appropriate demodulation technique (e.g., π/4-DQPSK) in demodulator 90. The demodulated bit stream 92 is then deinterleaved and decoded at 94 (i.e. the reverse operations of the transmitter channel encoder 76) by buffering frames of data and putting bits back in their original positions into separate time slots. In a two slot/frame system, two frames are buffered to deinterleave. While interleaving and deinterleaving have been described and protect against fading, they are not required. Control bits from the bit stream are stored in the SACCH buffer 96, and speech bits are stored in speech buffer 98. The SACCH data 100 from the SACCH buffer 96 are provided to the microprocessor 42 via host communication buffer 104 and host interface 106. Vocoded speech 108 is decoded in vocoder-decode 110 with the output of the vocoder-decode 110 being held in speech buffer 112. The digitized speech in buffer 112 is transferred via PCM interface 114 and serial output port to a digital to analog converter 115 which transforms the digitized speech back into an analog audio signal.

Figure 10:
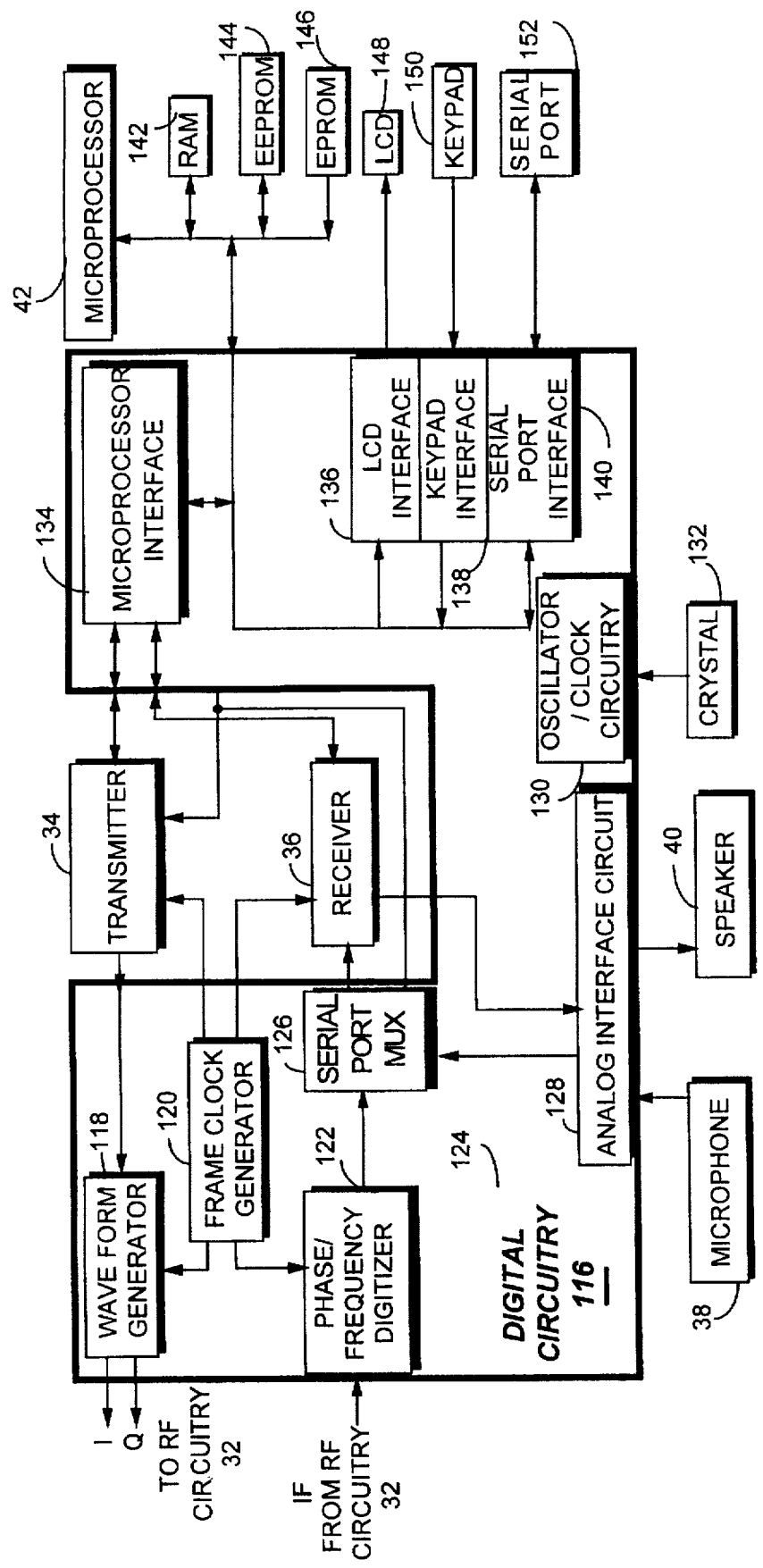
FIG. 10 is a function block diagram further illustrating additional aspects of the transceiver architecture of the dual mode radio.

FIG. 10 shows further details of particular interfacing circuitry which "glues" together the RF circuitry 32, dual mode transmitter 34, dual mode receiver 36, microprocessor 42, and analog components such as microphone 38 and speaker 40. Microprocessor 42 includes suitable memory such as RAM 142, EEPROM 146, and EPROM 146. The microprocessor 42 interfaces with the various dual mode transmitter and receiver DSPs at interface 134 and to the radio display 146, keypad 150, and serial data port 152 at LCD interface 136, keypad interface 138, and serial data port interface 140, respectively. The microprocessor 42 is connected to the memories and interfaces by corresponding data, address, and control bus lines. Crystal 132 is connected to oscillator/clock circuitry 130 for providing necessary time/frequency reference signals. Because so many of the components receive inputs from the oscillator/clock circuitry 130, connecting signal lines have been omitted for clarity. Microphone 38 and speaker 40 interface to the rest of the system by way of an analog interface circuit 128. Other features of the "glue" circuitry 116 include waveform generator 118 which receives signals from transmitter 34 and generates the quadrature signals that modulate the carrier in RF circuitry 32. The frame clock generator 120 generates the FDMA control channel frame sync pulses and the TDMA working channel frame sync pulses by dividing down form the master clock whose frequency may be for example 19.2 MHz. The analog intermediate frequency (IF) input from RF circuitry 32 is converted by phase/frequency digitizer 122 into digital phase/frequency samples. The phase digitizer performs analog to digital conversions for phase modulation by counting zero crossings of the analog I/F signal. A digital phase lock loop processes the output of the phase digitizer to generate a frequency output. Phase digitization is used in TDMA modulation, and the frequency conversion is used for FDMA-FSK modulation. Such a phase/frequency digitizer is described in more detail for example in U.S. Pat. No. 5,220,275, the disclosure of which is incorporated by reference. The serial port multiplexer 126 receives phase/frequency samples from the antenna (via RF circuitry 32) along with audio from the microphone 38 via analog interface 128.

Dual Mode Sites

Figure 11:
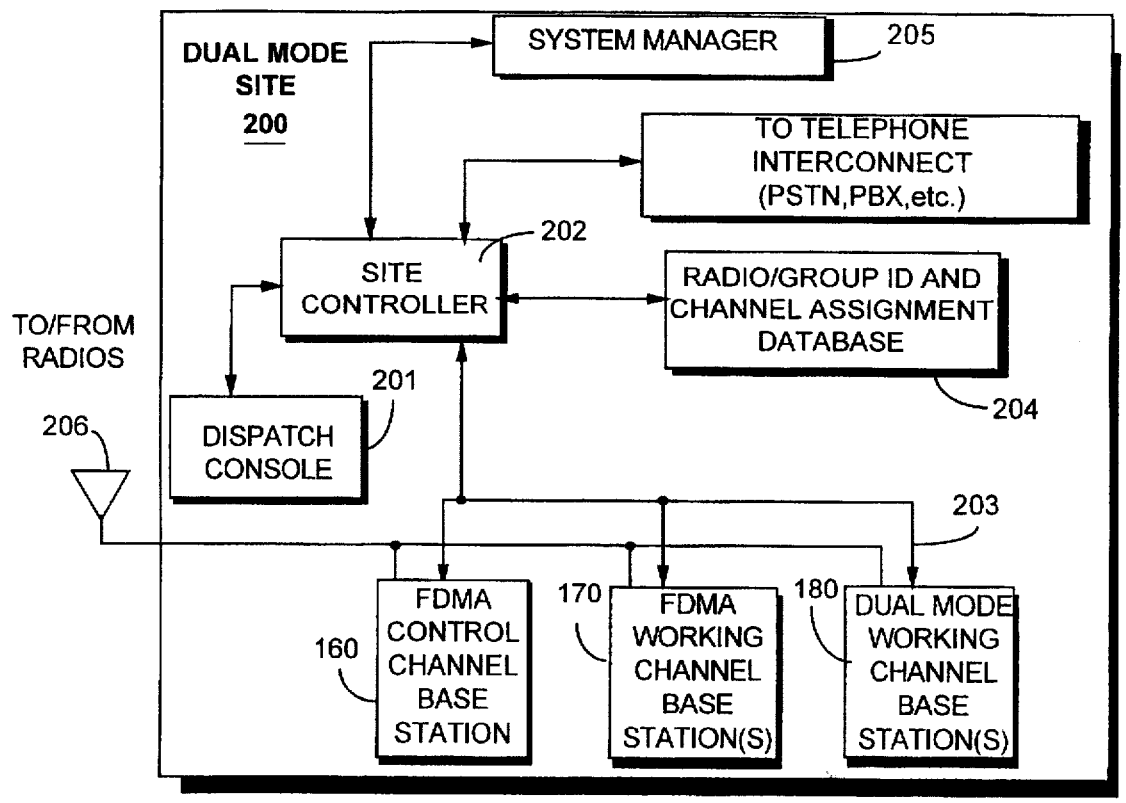
FIG. 11 is a function block diagram of a dual mode site that includes both FDMA and dual mode working channel base stations.
Figure 13:
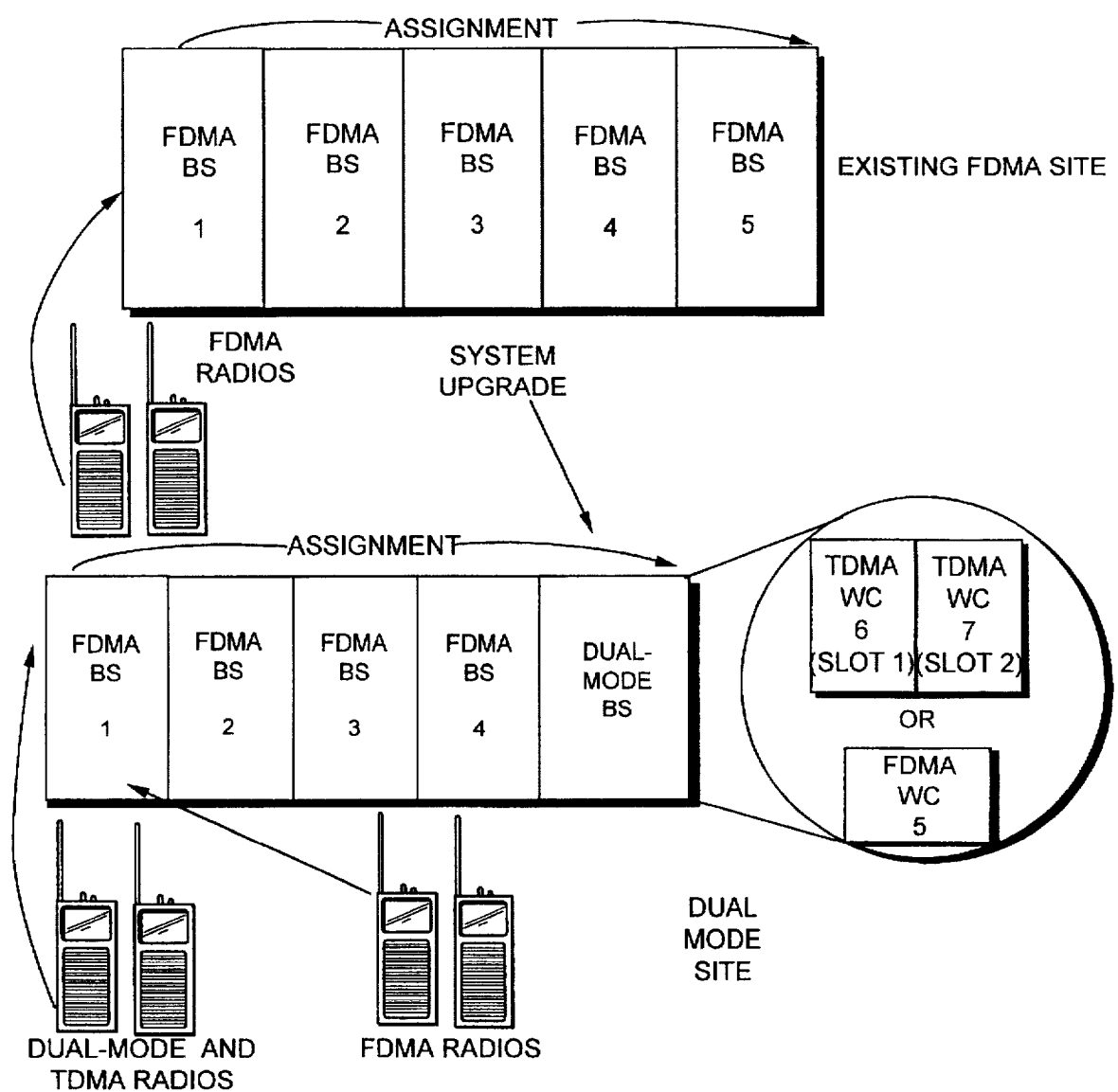
FIG. 13 illustrates a procedure for upgrading an existing FDMA site into a dual mode site to accommodate both FDMA and TDMA radio communications.

A dual mode site is now described in conjunction with FIGS. 11 and 13. FIG. 11 shows a high level function block diagram of a dual mode site 200. A site corresponds to a corresponding geographical area where individual radios of one or more groups of radio units communicate with each other (both within and outside of their own group) via shared radio base station repeater channels located at a trunked repeater control site 200. A dispatch console 201 may be housed directly at the repeater station site 200 or may be remotely located. Although only a single central site is shown in FIG. 11, it will be appreciated by those skilled in trunked radio repeater systems that one or more satellite receiver sites may be displaced spatially from the central site 200 where radio reception may temporarily be better. Received signals from the satellite sites as well as the central site are combined in conventional voting circuitry (not shown) to select the best available signal for control or communication purposes.

At central site 200, a transmitting antenna 206 connected to appropriate RF antenna circuitry such as RF circuitry 32 individually serves the plurality of duplex full RF channel transceivers included in RF repeater base stations 160, 170, and 180. Each base station's transmitter and receiver circuitry is controlled by a dedicated, microprocessor-based trunking control circuit. The trunking control processors communicate with one another and with the site controller 202 via control data bus 203. The primary site controller 202, a commercially available general purpose processor, provides the primary intelligence and control capability for the site 200. Alternate backup or "failsoft" functions may be incorporated within the base station trunking processors so as to provide continued trunked, repeater service even in the event that site controller 202 malfunctions or is otherwise taken out of service. Further details regarding the conventional single site repeater system including the trunking card and failsoft operational mode are disclosed in U.S. Pat. No. 5,175,866 which is incorporated herein by reference.

An optional telephone interconnect may also be provided to the public switched telephone network (PSTN) or other telephone exchanges, e.g. PBX. A system manager 205 is connected to the site controller 202 for overall system an element and control including generating and maintaining a master radio/group ID and channel assignment database. The database is downloaded from the system manager 205 via the site controller to the radio/group ID and channel assignment database 204 in each site.

In accordance with the present invention, the site 200 includes a single FDMA control channel base station 160, one or more FDMA working channel base stations 170, and one or more dual mode (TDMA) working channel base stations 180. In general, channel requests and assignments are made via the existing FDMA control channel under the control of the site controller 202 (during normal operation). The site controller 202 assigns via control channel messages an FDMA working channel base station 170 (a frequency) or a dual mode working channel base station 180 (a frequency and time slot) based on the capabilities of the radios/group (s) involved in the call as established in the radio/group ID and channel assignment database 204 and the availability of working channels.

Figure 12:
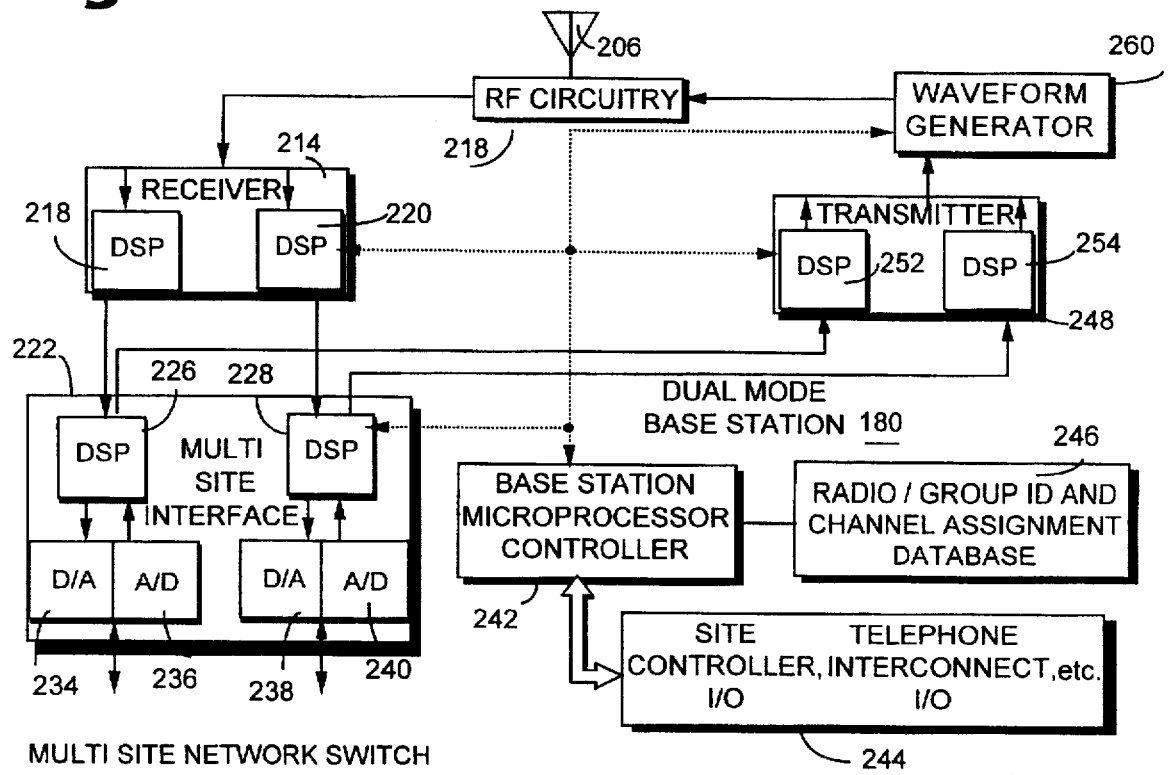
FIG. 12 is a function block diagram of a dual mode working channel base station.

FIG. 12 shows further detail of a dual mode working channel base station 180. As described above in conjunction with the dual mode radio in FIG. 6, in the preferred embodiment, digital signal processing (DSP) circuits are employed for radio transmit, radio receive, and system interface processing in dual mode base station 180. Signals are received and transmitted over common antenna 206 and filtered with the corresponding receive filter 208 or transmit filter 210 depending upon whether the dual mode base station 180 is transmitting or receiving. Receiver 214 includes two DSPs 218 and 220; transmitter 248 includes two DSPs 252 and 254. Each DSP handles the processing of one time slot of information in each frame. Here, since two time slots are provided per frame, there are two corresponding DSPs.

Multisite interface 222 also includes two DSPs 226 and 228 along with corresponding analog to digital and digital to analog converters 234, 236, 238, and 240 for interfacing a single site with a multisite network of sites connected via a multisite network switch as described in more detail below. Thus, the receiver 214, transmitter 248, and multisite interface 220 all include two digital signal processors to process for example two individual TDMA time slots per frame. Additional DSPs could be added to process additional time slot channels.

All connections to and from the DSPs are made via their respective serial ports. For example, control and channel signalling from the base station microprocessor controller 242 is transmitted to each DSP via each DSP's serial port. The base station microprocessor controller 242 performs the repeater's control shelf and trunking card functions including, for example, on the control channel to regulate protocol control and perform channel assignment processing and site databasing, and on the working channel, provide in progress call control, system interfacing, and test and alarm functions.

The transmitter DSPs 252 and 254 input serial bit streams, add forward error correction (FEC) bits to the bit stream, and output modulated waveforms. The receiver DSPs 218 and 220 input phase or frequency information and output the demodulated bit streams. The receiver 214 demodulates the carrier, acquires bit and slot synchronization, and corrects the bit stream using the forward error correction bits. Each of the receiver DSPs 218 and 220 select the data associated with the particular time slot it is responsible for demodulating. Waveform generator 260 (also a DSP) combines the individual time slots processed by transmitter DSPs 252 and 254 and sends a consolidated waveform to RF circuitry 218. RF circuitry 218 may for example be similar to the RF circuitry 32 described in conjunction with FIG. 7. The detailed description of the functions performed by the receiver and transmitter DSPs provided in conjunction with FIGS. 8 and 9 also applies to the DSPs in dual mode receiver 214 and dual mode transmitter 248 in the dual mode base station 180.

The multisite interface 222 permits the dual mode base station 180 to handle analog voice communications. Specifically, the multisite interface 222 converts between analog voice and digital vocoder bit streams. If the multisite interface 222 is to simply transmit a digital vocoder bit stream using for example a modem, the multisite interface DSPs 226 and 228 perform the modulation-demodulation function of a modem.

When the dual mode base station 180 operates in an FDMA mode, only one of each of the multisite interface DSPs, receive DSPs, and transmit DSPs are selectively activated, and the modulation-demodulation is changed to analog FM. In the FDMA mode, these DSPs perform various kinds of analog FM processing such as preemphasis and deemphasis filtering, amplitude limiting, low speed data filtering, and other audio filtering.

The base station microprocessor controller 242 may operate the dual mode base station 180 in a trunked mode as either a working channel or a control channel. To function as an FDMA control channel base station, base station controller 242 continuously transmits and receives RF messages consisting of channel requests and assignments, site identification messages, active channel updates, radio log-ins and status. All received inbound RF messages are translated and passed to the site controller 202. Received site controller messages are formatted for transmission on the outbound RF control channel. In the event that the site controller 202 is absent or is failed, the base station controller 242 assumes the site controller responsibility and provides a failsoft mode of trunking. Failsoft operation may be carried out in accordance with the procedures set forth in U.S. Pat. No. 5,175,866 assigned to the present assignee of this invention the disclosure of which is incorporated herein by reference.

For an FDMA or a TDMA working channel, the base station microprocessor trunking controller 242 is assigned to a call via messages from the site controller 202 via site controller I/O 244. The base station microprocessor trunking controller 242 reports to the site controller 202 the call request and generates outbound RF signalling to support call confirmation, group priority updates, and call termination. In the TDMA mode, the format of the data is different. For example, the low speed data used in FDMA is replaced by SACCH data in the TDMA mode, and the timing for call setup and drop is slightly different. Otherwise, the base station microprocessor controller 242 performs essentially the same functions in both the FDMA and TDMA modes.

FDMA Site Upgrade

The present invention provides a mechanism by which existing FDMA only sites may be easily and transparently (to the user) upgraded to include dual mode sites that accommodate TDMA radio communications. Referring to FIG. 13, an existing FDMA site is shown servicing FDMA radios. In this environment, an FDMA radio requests an FDMA base station working channel from working channels 2–5 via the FDMA control channel to the FDMA control channel base station 1. The control channel base station 1 then assigns one of the FDMA base stations 2–5 to function as a working channel for that radio communication. That existing FDMA site may be upgraded by replacing one or more of the FDMA base stations with a dual mode base station. In the example shown in FIG. 13, FDMA base station 5 is replaced with a dual mode base station (BS). The dual mode base station may provide in the FDMA mode one FDMA working channel 5 or in the TDMA mode two digital TDMA working channels 6 and 7 corresponding to TDMA time slot 1 and TDMA time slot 2. Of course, any number of existing FDMA base stations may be replaced with dual mode base stations or, in the alternative, if additional frequency bandwidth is available, additional dual mode base stations may be added.

Figure 14:
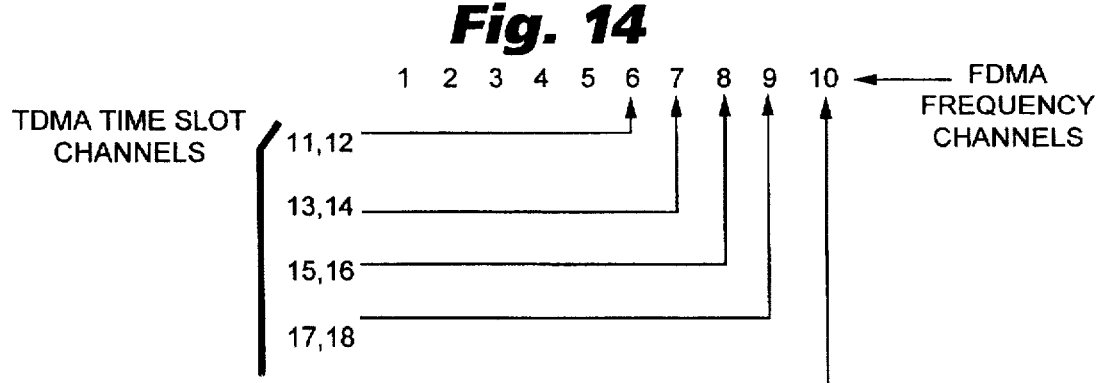
FIG. 14 illustrates a channel numbering scheme to accommodate both FDMA and TDMA radio communications.

FIG. 14 shows a channel numbering translation method in accordance with the present invention that demonstrates how in an existing FDMA channel numbering plan, TDMA channels can be added with minimal impact on that numbering plan. In essence, two or more new channel numbers representing time slots in the TDMA frame are assigned to certain existing FDMA working channels. In a two slot TDMA system, for example, one dual mode base station may operate as a single FDMA working channel (5) or two TDMA digital working channels (6 and 7). Thus, existing FDMA channel numbers may be maintained while adding or overlaying new TDMA working channels. The existing control channel remains the same and services both FDMA and TDMA working channel base stations.

FIG. 14 shows how an existing 10 channel FDMA system with ten base stations may be upgraded to a 20 channel dual mode system using those ten base stations. Each channel number 1–20 corresponds to only one mode—FDMA or TDMA. Therefore, the simple act of assigning a channel number to a dual mode radio unit automatically defines the mode in which the radio unit is to operate. Five of the existing base stations 1–5 remain FDMA only, and the five other existing base stations 6–10 are upgraded to dual mode and selectively operate in either the FDMA or TDMA modes. Channel number assignments 1–10 are FDMA working channels, and channel number assignments 11–20 are TDMA working channels. For example, TDMA channel 16 corresponds to frequency 8, time slot number 2 repeated by dual mode base station 8. FDMA channels 6–10 are reserved for dual mode base stations operating in an FDMA mode so channel 8 corresponds to the dual mode base station 8 operating in an FDMA mode.

Using this channel numbering scheme, a radio automatically recognizes the mode of a particular call based simply on the channel number assigned during call setup. Accordingly, each site and each base station includes a radio/group ID and channel assignment database 204 and 246, respectively. Dual mode flags are set in the databases for each radio ID and group ID to indicate whether (1) a radio unit is an FDMA only or a TDMA mode radio unit and (2) whether the group is FDMA only or dual mode. In addition, the channel number database 41 in each dual mode radio unit indicates which channels are FDMA and which channels are TDMA. In this way, a dual mode radio knows immediately from the assigned channel number the adopted mode of current communication and adapts its transceiving operations accordingly.

In normal trunking operation, the site controller 202 actively assigns channels using radio/group ID and channel database 204. In order for the base station microprocessor controller 242 to assume site controller responsibilities in a failsoft mode, the radio/group ID and channel assignment database 246 similar to the site controller database 204 is also maintained. The database information is used for call validation, channel selection, and priority assignment. The base station controller 242 therefore knows in the failsoft mode whether to assign a particular call to a dual mode TDMA channel or an FDMA channel and configure the assigned dual mode base station accordingly.

Single Site Call Processing

Group and individual radio unit identification numbers and mode flags are stored in the dual mode site data base 204 and FDMA and TDMA channels identified in database 41 of the dual mode radio units. The specific channel number assignment received from the site controller determines the mode of operation. A dual mode radio switches to the appropriate FDMA or TDMA mode after receiving a channel assignment from the site control channel. For existing FDMA radio units, channel access is the same as in the EDACS trunked radio single site system referred to above and described in U.S. Pat. No. 4,905,302. As described further below, the decision regarding which mode of communications to adopt and therefore the appropriate channel assignment, is made by the site controller 202 based on the type of radio unit involved in the communication, the type of communication requested, and the availability of channel resources.

Figure 15A:
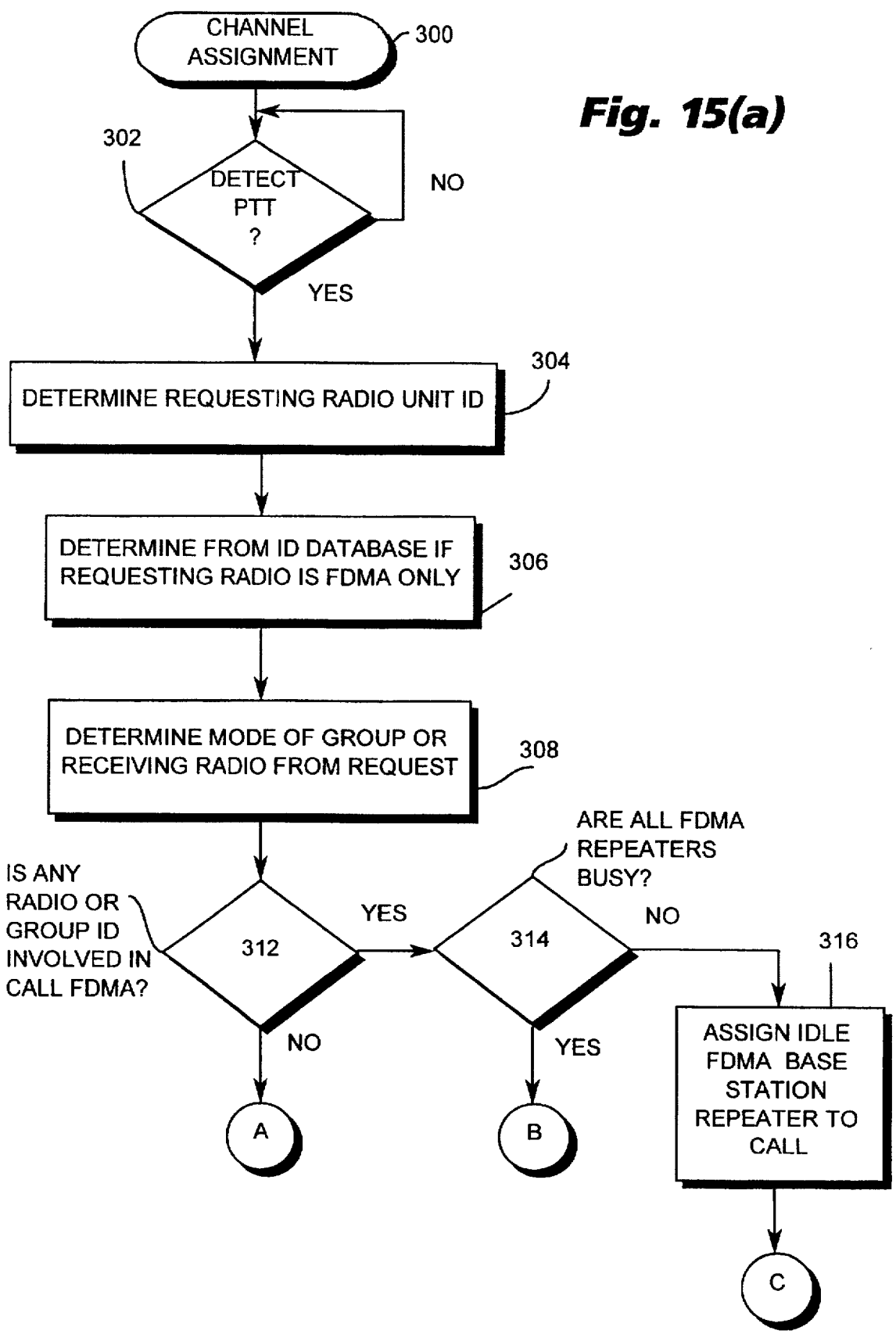
FIGS. 15(a) and 15(b) are flow chart diagrams illustrating channel assignment procedures.
Figure 15B:
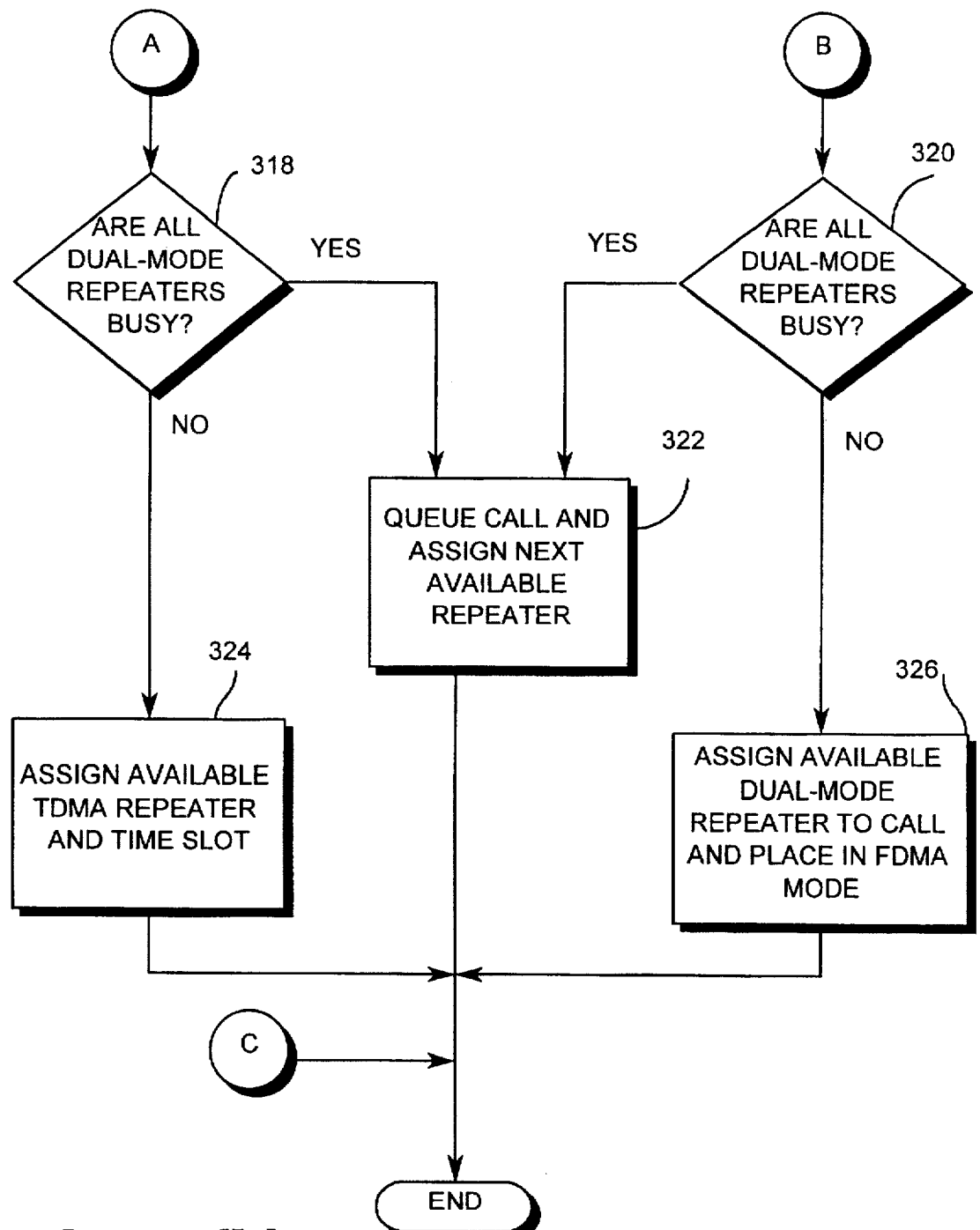

A channel assignment procedure performed by the site controller 202 at a dual mode site is now described in conjunction with the flow charts in FIGS. 15A and 15B. The channel assignment routine 300 begins with the determination of whether a radio's push-to-talk (PTT) button is depressed (step 302). When a radio's PTT button is depressed, that radio transmits over the inbound FDMA control channel to the site controller 202 a request message for a working channel that includes its radio ID and its currently selected group ID or the ID of an individual radio unit being called. Specifically, control channel information is received at the site 200 by FDMA control channel base station 160 and relayed onto the site controller 202. The site controller 202 determines the identity of the requesting radio (step 304) and determines from the radio/group ID and channel assignment database 204 if the requesting radio is an FDMA only or dual mode radio unit (step 306). The site controller 202 also checks database 204 to see if the requested group or receiving radio(s) is an FDMA group or radio(s) (step 308). If any radio or group ID to be involved in the call is FDMA only (step 312), control passes to decision block 314 where a determination is made whether all FDMA repeaters are busy. Thus, if an FDMA talk group is selected or an individual call is made with at least one of the radios being FDMA only, then the call must be assigned to an FDMA working channel base station repeater 170. If one of the FDMA working channel base station repeaters is idle, the site controller 202 assigns that idle FDMA repeater to the call and the call assignment proceeds in conventional manner. If all FDMA repeaters are busy, a determination is made in step 320 whether all dual mode base station repeaters are busy. If they are not, an available dual mode base station repeater is assigned to the call and placed in an FDMA mode (step 326). However, if all repeaters are busy, the call is queued in step 322 and assigned to the next available FDMA base station repeater.

Returning to decision block 312, if all the individual radio IDs and/or group IDs involved in the call are dual mode, a decision is made in block 318 whether all dual mode repeaters are busy. If not, an available TDMA repeater and time slot are assigned to the call in step 324. Otherwise, the call is queued, and the next available repeater (either FDMA only or dual mode) is assigned. If a dual mode repeater becomes available first, the call is handled in TDMA mode. However, in order to minimize access delay, if an FDMA base station repeater first becomes available, the call may be set up in an FDMA mode. Of course, if there are reasons to justify waiting for a TDMA base station repeater, the call request may be queued until such a TDMA base station repeater is available.

Accommodating FDMA and Dual Mode Sites and Roaming Radios in a Multisite Network The present invention provides interoperability between FDMA sites and dual mode sites so that radios in an FDMA site and radios in a dual mode site can communicate via a multisite network switch. In addition, the present invention allows a dual mode radio unit with TDMA capabilities to "roam" into an FDMA only site area and participate in RF trunked communication via a multisite switch with a TDMA group or with another dual mode unit in a radio-to-radio TDMA call. Of course, multisite calls in an FDMA mode are carried out in normal fashion as described for example in U.S. Pat. No. 5,200,954.

The following is an example of how a multisite communication is handled. A calling dual mode radio in an FDMA only originating site is placed in an FDMA mode with the FDMA site assigning an FDMA base station repeater to the call. Audio from that FDMA site is routed to a multisite network switch which converts, i.e. vocodes, the audio into TDMA format for communications with a dual mode site/dual mode radios. More specifically, the multisite network switch receives control messages from the originating FDMA site indicating that an FDMA base station repeater has been assigned to the call and determines whether the audio for the call should be vocoded for TDMA communications or routed "as is" to the receiving site based on the capabilities and resources of each site, base station, group, and radio assigned to the call. Since the multisite switch receives channel assignment information from each site in the multisite network, it knows what type of base station (FDMA or dual mode) is assigned to the call communication at each site. A similar procedure applies to FDMA dispatch consoles connected to the multisite switch with the console using a vocoder in order to participate in TDMA type communications.

Figure 16:
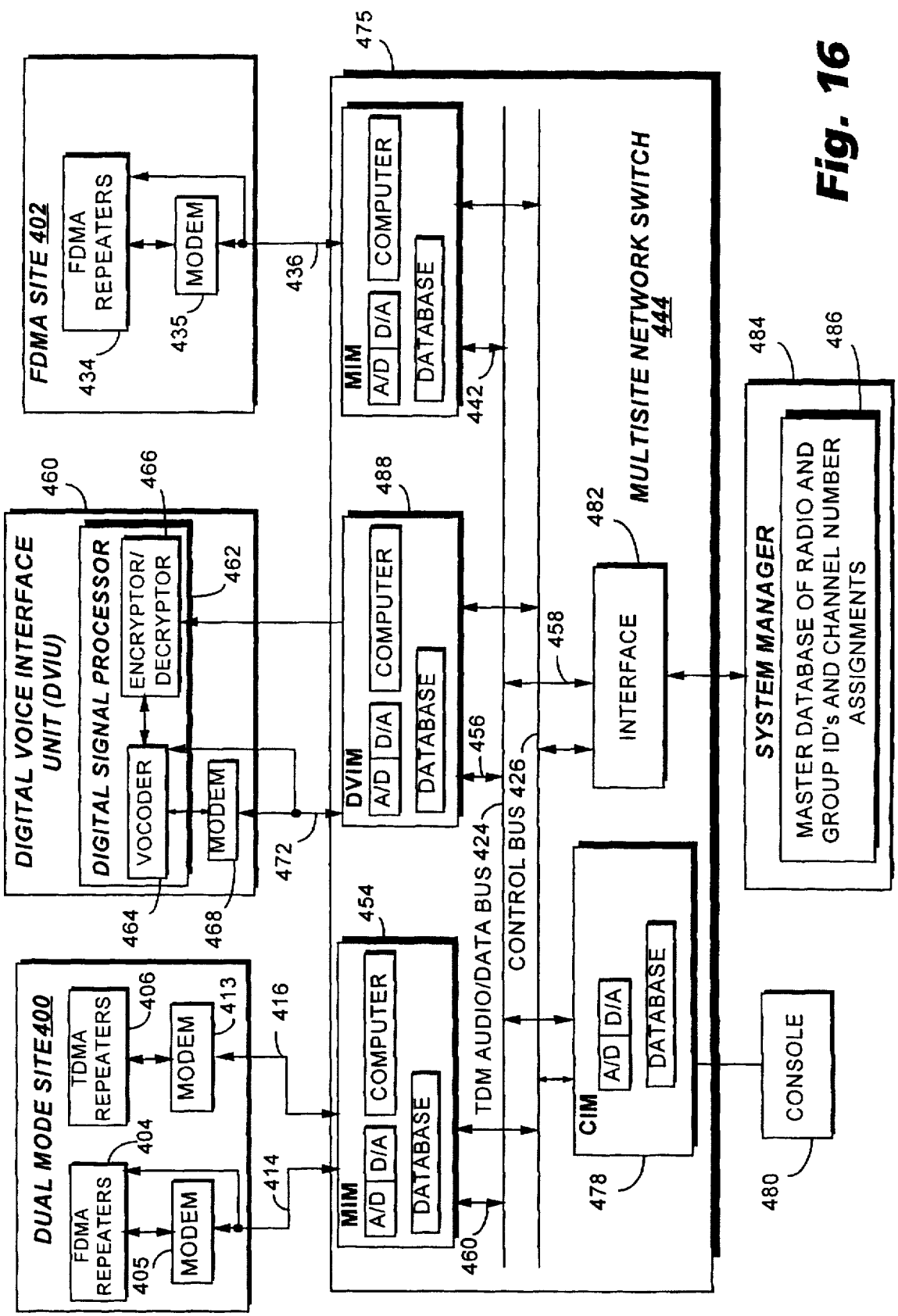
FIG. 16 is a function block diagram of a trunked, multisite radio communications system with both FDMA mode and dual mode sites.

The basic hardware involved in dual mode multisite network call processing is now described in conjunction with FIG. 16. U.S. Pat. No. 5,200,954 mentioned above provides a detailed description of a multisite RF communications network being incorporated herein by reference. Accordingly, the detailed operation of such a multisite switching network is not repeated here. A dual mode site 400 and an FDMA site 402 are connected to a multiswitch network switch 444. The multisite network switch 444 includes a time division multiplex (TDM) audio/data bus 424 for routing audio bits over predetermined time slots between sites and a control message bus 426.

The FDMA repeaters 434 in FDMA site 402 communicate with multisite switch 444 in an FDMA format including analog voice or digitized voice using standard 4-wire telephone lines 436. For an analog voice call, the baseband audio (0 to 3–4 KHz) is sent over one of the telephone lines 436 directly to the multisite switch 444. For a digitized voice or data (encrypted or nonencrypted), the digital data is converted by modem 435 into tones with these tones being transmitted over the telephone line 436 in analog form just like analog voice. A microprocessor-based site interface called a "MIM" included in the multisite switch 444 digitizes the analog audio/data information whether analog audio or analog tones from the site using analog to digital conversion means and routes the digitized information onto an assigned time slot over the TDM bus 424 via PCM link 442. The multisite network switch 444 transmits digital information on TDM time slots and does not distinguish between different type calls, e.g. analog, digital, vocoded, etc. The switch then routes the data over the TDM bus 424 to appropriate destinations such as other site interfaces including MIMs, a console interface module CIM 475, and a digital voice interface module DVIM 488 described more below. For the return path of a call, information directed to the FDMA site 402 is routed over PCM link 442, converted back into analog voice or modem tones by digital to analog conversion in MIM 475, and transmitted over telephone link 436.

Typically, console 480 operates in an FDMA mode and connects to multisite network switch 444 via CIM 478. Analog to digital and digital to analog conversion is performed in CIM 478 to effect the format conversions to/from PCM digitized form for routing over PCM link 454 to TDM bus 424. In dual mode site 400, information from FDMA repeaters 404 is routed to and from switch 444 using telephone lines 414 and modem 405 (where necessary) in the same manner as described over for FDMA repeaters 434 in FDMA site 402. TDMA base station repeaters 406 transmit vocoded speech and digital data to modem 413 which converts that digital information into modem tones for transmission over telephone link 416 to the multisite switch 444. The site interface MIM 475 converts the modem tones into digitized information which is routed onto the appropriate time slot over the TDM audio/data bus 424 via PCM link 460. TDMA information is directed to the dual mode site 400 from the TDM bus 424 over PCM link 460 and converted back into analog tones in MIM 475 for transmission over telephone line 416. Modem 413 converts the tones back into digital form for communication to the TDMA repeaters 406. The speech is then delivered to a corresponding TDMA repeater 406 for transmission on a corresponding radio frequency TDMA time slot working channel.

One or more digital voice interface unit (DVIU) 460 similar to that described in U.S. Pat. No. 5,365,590 are connected to DVIM 488. The function of DVIM 488 and DVIU 460 is to permit multisite calls where some participants operate in an FDMA mode and others operate in a TDMA mode. The DVIM 488 tracks call requests from FDMA sources like an FDMA site repeater or an FDMA console for communication with a TDMA group or radio. Each digital voice interface unit (DVIU) 460 is assigned by the DVIM 488 to handle a call and includes a digital signal processor 462 which comprises a vocoder 464 and/or an encrypter/decrypter 466. Upon detecting a call request on control bus 426 requiring conversion of analog audio from an FDMA site or FDMA console into TDMA format for a TDMA destination, the DVIM 488 configures a DVIU 460 to handle the call. The digitized FDMA audio is routed from the TDM bus 424 via PCM link 478 to DVIM 488 for digital to analog conversion and then transmission over line 472 to DVIU 460. Analog speech information is provided directly to the digital signal processor 462. Modem tones representing digitized speech are demodulated in modem 468, and the demodulated information is passed to DSP 462. The DVIM 488 sends control signals to the DVIU DSP 462 based on call set up parameters. For example, the DVIM 488 indicates whether or not the information is to be encrypted or not. The analog information is vocoded in vocoder 464 and encrypted (if necessary since encryption is optional) in encrypter 466 and the vocoded information is transmitted back to the multisite switch 444 via modem 468, line 472, CVIM 488 for digitization of the modem tones, and PCM link 456. From there, the vocoded speech may be routed to a TDMA repeater for broadcast in a TDMA format.

Conversely, for an FDMA repeater and/or the console to receive TDMA communications, the DVIM 488 pulls the TDMA audio data off the TDM bus 424 and routes through the DVIU to decode (and decrypt) the vocoded (and possibly encrypted) speech into a FDMA format. For communications involving only the transmission of data (nonvoice type data transmissions), the DVIU is not necessary since data is not vocoded and usually is not encrypted.

Thus, in addition to converting digitally encoded and/or encrypted audio as described in U.S. Pat. No. 5,365,590, the DVIM and DVIU in the present invention convert information between FDMA and TDMA formats as audio information is routed between sites via the multisite switch 444. This interoperability between FDMA and TDMA formats has a number of advantages. For example, a TDMA radio user may roam into FDMA only sites and still maintain communication with TDMA groups. In addition, FDMA only type units like existing consoles can participate in TDMA calls.

To increase communication reliability, a TDMA radio who roams into an FDMA site may optionally be prevented from communicating on an encrypted TDMA group. Exercising this option requires TDMA base station repeaters at both originating and destination sites for encrypted TDMA calls. A console may still participate in an encrypted TDMA call in this configuration using DVIU 460 to convert the audio data.

In another embodiment of the present invention similar to that shown in FIG. 16, time division multiplex (TDM) interfaces and TDM communications links may be used to permit the direct transmission of digitized audio and digital data information between the multisite switch TDM bus 424 and the base station repeaters at each site. For example, dual mode site 400 uses a T1 (i.e., 24 TDM channels) multiplexer connected to the multisite TDM bus 424 by a T1 link. Digitized voice including digitized voice and digital data from the FDMA repeaters 404 and vocoded speech and digital data from the TDMA repeaters 406 is time division multiplexed onto the T1 link using a T1 multiplexer directly from corresponding base station repeaters. In the opposite direction, digitized information is taken directly off of the multisite TDM bus 424 onto a T1 link and selectively routed via a T1 multiplexer to the appropriate base station repeater. The benefit of this particular embodiment is that many of the analog to digital and digital to analog conversions performed in the multisite interfaces (MIMs, CIMs, DVIMs) as well as modems are eliminated. In addition to eliminating this hardware, this embodiment is also advantageous because it reduces the number of data conversion operations which reduces the inevitable loss or distortion of information that occurs each time a signal format conversion takes place.

One manner in which multisite calls may be processed in accordance with the present invention will now be described in conjunction with the flow chart in FIG. 17. The following flow chart is executed by a computer in each site's multisite switch interface, i.e. each site's MIM, where each MIM's database is updated by the system manager 484 which maintains a database 486 of the master channel numbering assignment plan for all radio and group IDs in the multisite system. Initially, each MIM in the multisite network switch 444 receives a channel assignment message from the originating site over the multisite control bus 426 (step 600). Those secondary sites which are to be involved in the call, i.e. sites servicing radios belonging to the called group or a destination radio, then pass channel assignment request messages to the site controllers at the secondary sites (step 602). The site controllers at these secondary sites receive the channel request (step 604) and determine in decision block 606 whether the call corresponds to a TDMA group or a TDMA individual radio call. If not, analog audio information or modem data is routed to and from the secondary site (step 608) as in a conventional multisite system. However, if the call involves a TDMA group or a TDMA individual radio, a decision is made (step 610) whether the originating site base station repeater is operating in a TDMA mode. If so, a second decision is made (step 612) whether the secondary site base station repeater(s) assigned to this particular call is (are) operating in a TDMA mode. If so, the vocoder audio data is routed from the TDM bus 424 of the multisite switch 444 to the secondary site in block 616. Otherwise, the vocoder audio data is converted into analog FDMA form using the DVIM 488 and DVIU 460 assigned to handle this call, and the thus converted analog audio is then routed over the multiswitch audio data bus via appropriate MIM(s) to the secondary site(s) where the repeater(s) is (are) operating in an FDMA mode.

Returning to decision block 610, if the base station repeater at the originating site is not operating in a TDMA mode, a decision is made in block 614 whether base station repeater(s) assigned in the secondary site(s) is (are) operating in a TDMA mode. If not, the FDMA analog audio is routed to the secondary site(s) using conventional multisite procedures in block 626. However, if a secondary site repeater is operating in a TDMA mode, the analog audio information on the multisite TDM audio/databus 424 is converted in the DVIU 460 via the DVIM 488 into TDMA audio format (vocoded). The vocoded TDMA audio is then routed to the secondary site in block 624.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a radio communications system including a plurality of radio transceivers that communicate using a framed RF control channel on a first radio frequency allocated for use as the control channel and plural RF working channels corresponding to time slots time division multiplexed onto a second radio frequency, a method comprising the steps of:

establishing a relationship between a time when frames of the RF control channel on the first radio frequency are generated and a time when RF working channels corresponding to time slots on the second radio frequency are generated, and a radio transceiver using the established relationship in accessing one of the time slot working channels on the second radio frequency, wherein each control channel frame on the first radio frequency includes frame synchronization bits and each time slot on the second frequency includes slot synchronization bits and wherein the established relationship includes periodic alignment of frame synchronization bits and slot synchronization bits.

2. The system in claim 1, wherein the radio transceiver searches for the time slot synchronization bits on the second frequency using the frame synchronization bits on the first frequency as a reference.

3. In a radio communications system including a plurality of radio transceivers that communicate using a framed RF control channel on a first radio frequency allocated for use as the control channel and plural RF working channels corresponding to time slots time division multiplexed onto a second radio frequency, a method comprising the steps of:

establishing a relationship between a time when frames of the RF control channel on the first radio frequency are generated and a time when RF working channels corresponding to time slots on the second radio frequency are generated, and a radio transceiver using the established relationship in accessing one of the time slot working channels on the second radio frequency, wherein the establishing step includes providing a bit field in the control channel frame indicating a location in a subsequent control channel frame on the first frequency that will align with a time slot RF working channel on the second frequency.

4. The method in claim 3 wherein the RF working channel on the second frequency is divided into frames and at least two RF working channel time slots are included in each frame of the RF working channel radio frequency with each RF working channel time slot having synchronization bits and wherein the established relationship is that the synchronization bits of certain RF working channel time slots regularly and predictably align with synchronization bits in certain frames on the RF control channel on the first radio frequency.

5. The method in claim 4 wherein the plurality of transceivers include base station repeaters transmitting on outbound RF working channel time slots and portable radios transmitting on inbound RF working channel time slots and wherein the outbound RF working channel time slots are offset from corresponding inbound RF working channel time slots.

6. The method in claim 5 wherein the inbound RF working channel time slots include a bit field at the beginning of each RF working channel time slot to compensate for differences in times of receipt at a base station repeater of transmissions from radios assigned to adjacent RF working channel time slots.

7. In a radio communications system including a plurality of radios that communicate using a framed radio frequency control channel and a radio frequency working channel including plural time slots, a method for a radio to obtain synchronization on the working channel comprising the steps of:

establishing a relationship when certain control channel frames begin at the same time as certain working channel time slots;

monitoring the control channel frequency to determine if a working channel has been assigned to a radio;

tuning to an assigned working channel frequency and demodulating data bits received on the assigned working channel frequency;

buffering a predetermined number of said data bits;

calculating one or more potential time slot synchronization positions in the buffered data bits based on the established relationship; and detecting time slot synchronization using the calculated position.

8. A method for coordinating communications among a plurality of transceivers including portable radio transceivers where first ones of the portable radio transceivers operate only in a first mode and second ones of the portable radio transceivers selectively operate in one of the first and a second mode, comprising the steps of:

assigning a first mode indicator to the first portable radio transceivers and a second mode indicator to the second portable radio transceivers;

storing the first and second mode indicator assignments; and selecting a mode of operation for a radio communication between one of the first portable radio transceivers and one of the second portable radio transceivers based on mode indicator assignments of each of the portable radio transceivers involved in the radio communication.

9. The method in claim 8, further comprising the steps of:

defaulting to the first mode when a first portable radio transceiver is involved in the radio communication.

10. A method for coordinating communications among a plurality of transceivers including portable radio transceivers and base station repeaters where first ones of the transceivers operate only in a first mode and second ones of the transceivers selectively operate in one of the first and a second mode, comprising the steps of:

assigning a first mode indicator to the first transceivers and a second mode indicator to the second transceivers;

storing the first and second mode indicator assignments;

selecting a mode of operation based on mode indicator assignments of the transceivers involved in a radio transmission;

requesting a radio communication between second ones of the transceivers;

selecting a base station repeater operating in the second mode; and if a base station repeater operating in the second mode is unavailable, selecting a first available base station repeater irrespective of mode.

11. The method in claim 10, wherein if the first available base station repeater operates only in the first mode, operating the second portable radio transceivers in the radio communication in the first mode.

12. A trunked radio communication system comprising:
plural portable radios, some of the portable radios being dual mode portable radios for selectively operating in first and second modes, the dual mode portable radios including a memory for storing channel assignments with some channel assignments specified for communications in the first mode and some channel assignments specified for communications in the second mode;
a controller for coordinating trunked radio communications between the portable radios including making channel assignments;
wherein when the controller assigns a channel to a trunked radio communication involving at least one dual mode portable radio and at least one other portable radio, the dual mode portable radio operates in one of the first and second modes based on a mode specified for the assigned channel stored in the memory determined using a mode of operation of the one other portable radio.

13. The system in claim 12, further comprising:
plural base station repeaters for transceiving radio communications between the plural radios, some of the base station repeaters operating as dual mode repeaters, wherein when the controller assigns a dual mode repeater to a trunked radio communication, the dual mode repeater operates in one of the first and second modes based on the mode specified for the assigned channel.

14. The system in claim 12, wherein the first mode corresponds to a frequency division multiple access (FDMA) mode of communication and the second mode corresponds to a time division multiple access (TDMA) mode of communication.

15. A method for communicating within a radio repeater system having an RF control channel and plural RF working channels at least one of the working channels being a single frequency working channel and at least one of the working channels being a slotted working channel for transmitting digital signals during one of plural time slots time division multiplexed onto a radio frequency, said method comprising the steps of:
storing for individual radios a radio identification and a corresponding mode indication of whether a radio can communicate on a slotted working channel;
requesting assignment of a working channel over the control channel; and
determining whether to assign the single frequency working channel or the slotted working channel based on a radio identification of radios to be involved in a radio communication transmitted over the control channel.

16. The method in claim 15, further comprising:
assigning a working channel based on mode indications corresponding to the identifications of each radio to be involved in the radio communication.

17. The method in claim 16, wherein if one of the radios to be involved in the trunked radio communication operates only using the single frequency working channel, the method further comprises the step of setting up a trunked communication over the single frequency working channel.

18. A communication method for a plurality of radios assigned to one or more radio talk groups of at least three or more portable radios in a radio talk group in a trunked radio repeater system having an RF control channel and plural RF working channel, at least one of the working channels being a single frequency working channel and at least one of the working channels being a slotted working channel for transmitting digital signals during one of plural time slots time division multiplexed onto another radio frequency, said method comprising the steps of:
assigning a radio talk group identification to each radio talk group specifying a mode of operation;
transmitting to a control site over the RF control channel a request for a working channel for communicating with one of the groups of radios, the request including a radio talk group identification signal, and
at the control site, determining whether to assign the single frequency working channel or the slotted working channel to the radio talk group communication in response to the request based on whether the radio talk group identification corresponds to a single frequency working channel mode of operation or a slotted working channel mode of operation.

19. The method in claim 18, wherein if one of the radios involved in the group communication operates only using the single frequency working channel, setting up a trunked communication over the single frequency working channel.

20. In a trunked radio repeater communication system having a control channel and plural working channels, one of the working channels being frequency division multiple access (FDMA) working channels for transmitting on an RF frequency and another of the working channels being a time division multiple access (TDMA) working channel for transmitting during one of plural time slots time division multiplexed onto another RF frequency, a dual mode portable radio unit, comprising:
a dual mode transceiver for participating in trunked radio communications over the FDMA working channel in an FDMA mode and for participating in trunked radio communications over the TDMA working channel in a TDMA mode;
a memory storing an identification of each potential working channel as the FDMA working channel or the TDMA working channel; and
a processor for receiving a working channel assignment over the control channel, determining the identification corresponding to the assigned working channel, and operating the dual mode transceiver in one of the FDMA and TDMA modes based on the determined identification.

21. The dual mode radio in claim 20, wherein the dual mode transceiver includes a dual mode transmitter, a dual mode receiver and radio frequency circuitry connected to and used by the dual mode transmitter and receiver in both the FDMA and TDMA modes.

22. The dual mode radio in claim 20, wherein the dual mode transceiver includes a vocoder to encode and decode speech using a linear predictive coding algorithm in the TDMA mode.

23. The dual mode radio in claim 20, wherein the dual mode radio transceiver employs frequency modulation in the FDMA mode and $\pi/4$-differential quadrature phase shift keying or continuous phase shift modulation in the TDMA mode.

24. A trunked radio repeater communication system having a control channel base station repeater and plural working channel base station repeaters, one of the working channel repeaters operating only as a frequency division multiple access (FDMA) repeater for transmitting a call between portable radio units only on an FDMA working channel on an RF frequency allocated to handle a single FDMA working channel and another of the working channel repeaters being a dual mode repeater for selectively operating in one of a first mode as a time division multiple access (TDMA) working channel for transceiving a TDMA call between portable radio units during one of plural time slot channels time division multiplexed onto a single RF frequency different than the one RF frequency allocated to handle a single FDMA working channel and a second mode as an FDMA working channel for transceiving an FDMA call between portable radio units, wherein the selective operation of the dual mode repeater is based on an ability of a portable radio unit involved in a call to participate in one or both of FDMA and TDMA communications.

25. The trunked radio repeater communication system in claim 24, wherein the dual mode base station repeater comprises:

a dual mode transceiver for participating in trunked radio communications over the FDMA working channel in the second mode and for participating in trunked radio communications over the TDMA working channel in the first mode; and a processor for receiving a working channel assignment from a portable radio over the control channel, determining a mode corresponding to the assigned working channel, and operating the dual mode transceiver in one of the FDMA and TDMA modes based on the determined mode.

26. The trunked radio repeater communication system in claim 25, wherein the dual mode base station repeater further comprises:

a memory storing an identification of each potential working channel as an FDMA working channel or a TDMA working channel to be used by the dual mode base station repeater during failsoft operations.

27. The dual mode radio in claim 25, wherein the dual mode transceiver includes a dual mode transmitter, a dual mode receiver and radio frequency circuitry connected to and used by the dual mode transmitter and receiver in both FDMA and TDMA modes.

28. The dual mode radio in claim 25, wherein the dual mode transceiver includes a vocoder to encode and decode speech using a linear predictive coding algorithm in the TDMA mode.

29. The dual mode radio in claim 25, wherein the dual mode radio transceiver employs frequency modulation in the FDMA mode and π/4-differential quadrature phase shift keying or continuous phase shift modulation in the TDMA mode.

30. A trunked radio repeater communication system, including a plurality of portable radio units for communicating via a central site control station having a control channel and plural working channels, one of the working channels being a frequency division multiple access (FDMA) working channel for transmitting on an RF frequency and others of the working channels being time division multiple access (TDMA) working channels for transmitting during time slots provided on a single RF frequency, comprising:

a memory storing identification information for each portable radio unit and corresponding mode information indicating whether each radio unit is capable of communicating over a TDMA working channel; and a site controller located in the central site control station for receiving a working channel request over the control channel and determining from the working channel request and the information stored in the memory whether to assign the TDMA or the FDMA working channel.

31. A trunked radio repeater communication system, including a plurality of portable radio units for communicating via a central site control station having a control channel and plural working channels, one of the working channels being a frequency division multiple access (FDMA) working channel for transmitting on an RF frequency and others of the working channels being time division multiple access (TDMA) working channels for transmitting during time slots provided on a single RF frequency, wherein the same control channel is used to assign and monitor both the FDMA and TDMA working channels, and wherein one of the FDMA and the TDMA working channels is assigned according to communication capabilities of portable radio units involved in a communication.

32. The trunked radio repeater communication system in claim 31, further comprising plural repeaters one being capable of transceiving only FDMA communications and another being capable of transceiving both FDMA and TDMA communications.

33. The trunked radio repeater communication system in claim 32, wherein the FDMA or the TDMA working channel is assigned according to communication capabilities of the repeater and radio units involved in a communication.

34. The trunked radio repeater communication system in claim 31, wherein the control channel is an FDMA control channel.

35. A method for adapting an existing trunked radio communication system including a plurality of base station repeaters with one repeater being a control channel repeater through which mobile or portable radio units request access to a radio working channel, and plural frequency division multiple access (FDMA) base station repeaters providing FDMA working channels, where one trunked FDMA radio communication occupies one radio frequency, to accommodate time division multiple access (TDMA) working channels, where one trunked TDMA radio communication occupies one of plural time slots on one radio frequency, comprising:

adding a TDMA base station repeater to the existing trunked radio communication system to provide one or more TDMA working channels;

determining whether a trunked radio communication is to be carried out on an FDMA or a TDMA working channel based on whether portable radio units to be involved in the trunked radio communication can communicate on only one of the FDMA and the TDMA working channels or on either the FDMA or the TDMA working channels; and assigning the radio communication to one of the FDMA base station repeaters or the TDMA base station repeater based on the determining step.

36. A method for assigning a working channel in a multisite trunked radio communications system including plural sites and plural portable radios, some of the portable radios operating only in a first mode and some of the portable radios operating in either the first or a second mode, each site including plural repeaters, one repeater operating only in the first mode and another repeater operating in either the first or the second mode, comprising the steps of:

(a) determining what mode or modes a portable radio requesting a working channel can operate;

(b) determining what mode or modes portable radios to be involved in the communication with the requesting radio can operate;

(c) if any radios are determined in steps (a) or (b) to operate only in the first mode, assigning the communication to an available repeater that can operate in the first mode.

37. The method in claim 36, further comprising the steps of:

(d) if all radios are determined in steps (a) or (b) to operate in the second mode, assigning an available repeater that operates in the second mode.

38. The method in claim 37, wherein if there are no available repeaters that can operate in the second mode, assigning an available first mode repeater and conducting the communication in the first mode.

* * * * *

UNITED STATES PATENT AND TRADEMARK OFFICE
CERTIFICATE OF CORRECTION

PATENT NO. : 5,790,527
DATED : August 4, 1998
INVENTOR(S) : William Janky, et. al.

It is certified that error appears in the above-identified patent and that said Letters Patent is hereby corrected as shown below:

Title page, item [73], Assignee: should read --Ericsson, Inc., Research Triangle Park, North Carolina--.

Signed and Sealed this

Twentieth Day of October, 1998

Attest:

BRUCE LEHMAN

Attesting Officer

Commissioner of Patents and Trademarks